(12) United States Patent
Kitano et al.

(10) Patent No.: US 6,423,787 B1
(45) Date of Patent: *Jul. 23, 2002

(54) POLYMERS, PROCESSES FOR PRODUCING THE SAME, AND CURABLE COMPOSITIONS PRODUCED THEREFROM

(75) Inventors: Kenichi Kitano; Yoshiki Nakagawa; Masato Kusakabe, all of Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/403,272

(22) PCT Filed: Apr. 17, 1998

(86) PCT No.: PCT/JP98/01759

§ 371 (c)(1),
(2), (4) Date: Dec. 30, 1999

(87) PCT Pub. No.: WO98/47931

PCT Pub. Date: Oct. 29, 1998

(30) Foreign Application Priority Data

Apr. 18, 1997 (JP) .............................................. 9-101866
Apr. 18, 1997 (JP) .............................................. 9-102136

(51) Int. Cl.[7] .............................. C08F 8/00; C08F 8/26; C08F 8/42

(52) U.S. Cl. .................. 525/366; 525/332.9; 525/330.6
(58) Field of Search .............................. 525/330.6, 366, 525/332.9

(56) References Cited

U.S. PATENT DOCUMENTS

| 5,763,548 A | 6/1998 | Matyjaszewski et al. ... 526/135 |
| 5,789,487 A | 8/1998 | Matyjaszewski et al. ... 525/301 |
| 5,807,937 A | 9/1998 | Matyjaszewski et al. ... 526/135 |
| 6,274,688 B1 * | 8/2001 | Nakagawa et al. ...... 526/329.7 |

FOREIGN PATENT DOCUMENTS

| JP | 6-211922 | * | 8/1994 |
| WO | WO 96/30421 | | 10/1996 |

* cited by examiner

*Primary Examiner*—D. R. Wilson
(74) *Attorney, Agent, or Firm*—Connolly Bove Lodge & Hutz

(57) ABSTRACT

An alkenyl- or crosslinkable silyl-terminated vinyl polymer is provided. Such a functional group is introduced into its terminus at a high ratio, not via sulfur atoms. Those polymers can be prepared by polymerizing a vinyl monomer for obtaining a halogen-terminated vinyl polymer, and then substituting an oxy anion or carbanion having such a functional group for the terminal halogen of said polymer.

12 Claims, No Drawings

POLYMERS, PROCESSES FOR PRODUCING THE SAME, AND CURABLE COMPOSITIONS PRODUCED THEREFROM

TECHNICAL FIELD

The present invention relates to a vinyl polymer having an alkenyl or crosslinkable silyl group at at least one terminus of its main chain, a method for preparing the polymer, and a curable composition containing the polymer.

BACKGROUND ART

It is known that a polymer having a crosslinkable functional group at a terminus of its main chain cures singly or in combination with a suitable curing agent to give a cured product with high heat resistance and durability. Among them, a polymer having an alkenyl or crosslinkable silyl group at a terminus of its main chain is its representative example. A polymer having an alkenyl group at a terminus of its main chain crosslinks and cures in the presence of a hydrosilyl-containing compound as a curing agent or by way of photopolymerization reaction. Moreover, a polymer having a crosslinkable silyl group at a terminus of its main chain absorbs moisture in the presence of a suitable condensation catalyst to provide a cured product.

The main chain of such a polymer having an alkenyl group or a crosslinkable silyl group at a terminus of its main chain includes polyether polymers such as polyethylene oxide, polypropylene oxide and polytetramethylene oxide; hydrocarbon polymers such as polybutadiene, polyisoprene, polychloroprene, polyisobutylene, etc., inclusive of hydrogenation products thereof; and polyester polymers such as polyethylene terephthalate, polybutylene terephthalate, polycaprolactone, etc. According to the main chain structure and mode of crosslinking, those polymers have been used in various applications.

These polymers can be obtained by ionic polymerization or polycondensation reaction, vinyl polymers having crosslinkable functional groups at a terminus of its main chain as synthesized by radical polymerization have little been used in commercial applications. Among vinyl polymers, (meth)acryl polymers have high weather resistance, good clarity and other favorable characteristics, which are not found in polyether polymers, hydrocarbon polymers, and polyester polymers mentioned above. For example, those polymers having alkenyl or crosslinkable silyl groups not in their main chain but in their side chains have been utilized as coating agents featuring high weather resistance.

As compared with this vinyl polymer having crosslinkable functional groups in its side chain, a vinyl polymer having crosslinkable functional groups at a terminus of its main chain could provide cured products with excellent properties about curing. Accordingly, many workers have been endeavoring to develop a expedient technology for preparing such a polymer in earnest but it is not an easy task to establish a commercially useful production technology.

Japanese Kokai Publication Hei-1-247403 discloses a method for synthesizing a vinyl polymer having an alkenyl group at both termini, which comprises using an alkenyl-containing disulfide as a chain transfer agent. Japanese Kokai Publication Hei-6-211922 discloses a method of synthesizing a vinyl polymer having an alkenyl group at both termini, which comprises synthesizing a vinyl polymer having a hydroxyl group at both termini by means of a hydroxyl-containing disulfide as a chain transfer agent, and synthesizing a vinyl polymer having an alkenyl group at both termini by exploiting the reactivity of the hydroxyl groups. However, these methods require to use a chain transfer agent in a substantial amount in order to introduce alkenyl groups into both termini without fail and this entails difficulties in process control. Moreover, since the vinyl polymers as obtained by these methods have a bond between an alkenyl group and its main chain via a sulfur atom, the polymers have a reverse effect on their weather resistance, thus their inherent property, and further give a problem in odds of sulfur itself.

In the otherhand, Japanese Kokai Publication Sho-59-168014 discloses a method of introducing a crosslinkable silyl group to both termini of a vinyl polymer, which comprises using a crosslinkable silyl-containing disulfide as a chain transfer agent. Moreover, Japanese Kokai Publication Sho-61-133201 discloses a method of introducing a crosslinkable silyl group to both termini of a vinyl polymer, which comprises using hydrosilane or silane halide each having a crosslinkable silyl group. However, in these methods, it is difficult to certainly introducing a crosslinkable silyl group to both termini thereof so that cured products having satisfied properties cannot be obtained. Further, since the ordinary radical polymerization reaction is used in these methods, the molecular weight and molecular weight distribution (the ratio of weight average molecular weight to number average molecular weight) of the product polymer cannot be easily controlled.

SUMMARY OF THE INVENTION

In the light of the prior arts, the present invention has its object to provide a vinyl polymer having an alkenyl group or a crosslinkable silyl group at a terminus of its main chain at a high ratio, not via sulfur atoms, a method for preparing said polymer, and a curable composition containing said polymer.

Thus, the present invention is related to a vinyl polymer having an alkenyl group of the following general formula (1) at at least one terminus of its main chain. Particularly, when $R^3$ is a divalent organic group represented by —C(O)—$R^5$—, the vinyl polymer has an alkenyl group of the following general formula (1') at at least one of terminus of its main chain. In this specification, such a polymer is referred to as Polymer (A).

  (1)

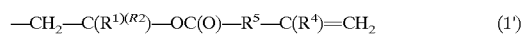  (1')

In the formulas, $R^1$ and $R^2$ are the same or different, and each represents a univalent organic group. $R^3$ represents a divalent organic group having 1 to 20 carbon atoms and optionally containing one or more ether or ester bonds. $R^4$ represents hydrogen, an alkyl group having 1 to 10 carbon atoms, an aryl group having 6 to 10 carbon atoms, or an aralkyl group having 7 to 10 carbon atoms. $R^5$ represents a direct bond or a divalent organic group having 1 to 19 carbon atoms and optionally containing one or more ether or ester bonds.

Further, the present invention is related to a vinyl polymer having a crosslinkable silyl group at at least one terminus of its main chain, as prepared by adding a hydrosilane compound having a crosslinkable silyl group to the above-mentioned Polymer (A). In this specification, such a polymer is referred to as Polymer (B).

Further, the present invention is related to a vinyl polymer having an alkenyl group of the following general formula (5) at at least one terminus of its main chain. In this specification, such a polymer is referred to as Polymer (C).

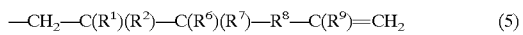

$$-CH_2-C(R^1)(R^2)-C(R^6)(R^7)-R^8-C(R^9)=CH_2 \quad (5)$$

In the formula, $R^1$ and $R^2$ are the same groups as defined above; R6 and R7 are the same or different, and each represents an electron-withdrawing group or one of them represents an electron-withdrawing group with the other representing hydrogen, an alkyl group having 1 to 10 carbon atoms, or phenyl. $R^8$ represents a direct bond or a divalent organic group having 1 to 10 carbon atoms and optionally containing one or more ether bonds. $R^9$ represents hydrogen, an alkyl group having 1 to 10 carbon atoms, an aryl group having 6 to 10 carbon atoms, or an aralkyl group having 7 to 10 carbon atoms.

The present invention is related to a vinyl polymer having a crosslinkable silyl group of the following general formula (6) at at least one terminus of its main chain. In this specification, such a polymer is referred to as Polymer (D).

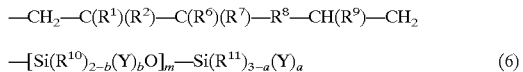

$$-CH_2-C(R^1)(R^2)-C(R^6)(R^7)-R^8-CH(R^9)-CH_2$$
$$-[Si(R^{10})_{2-b}(Y)_bO]_m-Si(R^{11})_{3-a}(Y)_a \quad (6)$$

In the formula, $R^1$, $R^2$, $R^6$, $R^7$, $R^8$ and $R^9$ are the same groups as defined above. $R^{10}$ and $R^{11}$ are the same or different, and each represents an alkyl group having 1 to 20 carbon atoms, an aryl group having 6 to 20 carbon atoms, an aralkyl group having 7 to 20 carbon atoms, or a triorganosiloxy group of the formula $(R')_3SiO-$ ($R'$ represents a univalent hydrocarbon group having 1 to 20 carbon atoms and three R's are the same or different) and when two or more $R^{10}$ or $R^{11}$ occur, they may be the same or different. Y represents hydroxyl or a hydrolyzable group and when two or more Ys occur, they may be the same or different. a represents 0, 1, 2 or 3. b represents 0, 1 or 2. m represents an integer of 0 to 19, provided that $a+mb \geq 1$.

The present invention is related to a method for preparing Polymer (A), which comprises polymerizing a vinyl monomer to obtain a vinyl polymer having a group of the following general formula (7) at at least one terminus of its main chain, and substituting an alkenyl-containing oxy anion of the following general formula (8) or, in case of $R^3$ being a divalent organic group represented by $-C-(O)-R^5-$, of the following general formula (8') for the terminal halogen of said polymer.

$$-CH_2-C(R^1)(R^2)(X) \quad (7)$$

In the formula, $R^1$ and $R^2$ are the same as defined above, and X represents chlorine, bromine, or iodine.

$$M^+O^--R^3-C(R^4)=CH_2 \quad (8)$$

$$M^+O^--C-(O)-R^5-C(R^4)=CH_2 \quad (8')$$

In the formula, $R^3$, $R^4$ and $R^5$ are the same as defined above, and $M^+$ represents an alkali metal ion or a quaternary ammonium ion.

Further, this invention is related to a method for preparing Polymer (B), which comprises adding a hydrosilane compound having a crosslinkable silyl group of the following general formula (9) to said Polymer (A).

$$H-[Si(R^{10})_{2-b}(Y)_bO]_m-Si(R^{11})_{3-a}(Y)_a \quad (9)$$

In the formula, $R^{10}$, $R^{11}$, Y, a, b and m are the same as defined above.

Further, this invention is related to a method for preparing said Polymer,(C), which comprises polymerizing a vinyl monomer to obtain said vinyl polymer having the group of the above general formula (7) at at least one terminus of its main chain, and substituting an alkenyl-containing carbanion of the following general formula (10) for the terminal halogen of said polymer.

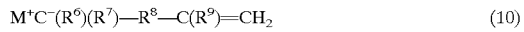

$$M^+C^-(R^6)(R^7)-R^8-C(R^9)=CH_2 \quad (10)$$

In the formula, $R^6$ to $R^9$, and $M^+$ are the same as defined above.

Furthermore, the present invention is related to a method for preparing said Polymer (D), which comprises polymerizing a vinyl monomer to obtain said vinyl polymer having the group of the above general formula (7) at at least one terminus of its main chain, and substituting an crosslinkable silyl-containing carbanion of the following general formula (11) for the terminal halogen of said polymer.

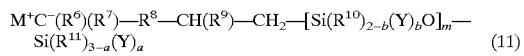

$$M^+C^-(R^6)(R^7)-R^8-CH(R^9)-CH_2-[Si(R^{10})_{2-b}(Y)_bO]_m-Si(R^{11})_{3-a}(Y)_a \quad (11)$$

In the formula, $R^6$ to $R^{11}$, Y, $M^+$, a, b and m are the same groups as defined above.

Furthermore, the present invention is related to a method for preparing said Polymer (D), which comprises adding the above crosslinkable silyl-containing hydrosilane compound of the general formula (9) to said polymer (C).

Furthermore, the present invention is related to a curable composition comprising (a) said Polymer (A) or (C) and (b) a hydrosilyl-containing compound.

Furthermore, the present invention is related to a curable composition comprising said Polymer (B) or (D) as a principal component.

DETAILED DESCRIPTION OF THE INVENTION

In the following, the present invention is described in detail.

Polymer (A)

Polymer (A) according to the present invention is a vinyl polymer having an alkenyl group of the above general formula (1) at at least one terminus of its main chain. In particular, when, in the above general formula (1), $R^3$ is a divalent organic group represented by $-C(O)-R^5-$, the polymer is a vinyl polymer having an alkenyl group of the general formula (1') at at least one terminus of its main chain.

In the above general formula (1) or (1'), $R^1$ and $R^2$ is the same or different and each represents a univalent organic group. As to the above-mentioned univalent organic group, it is not limited as far as a univalent organic group derived from the group bound to a vinyl group of a vinyl monomer used for the production of a main chain of the polymer.

In the above general formula (1), $R^3$ represents a divalent organic group having 1 to 20 carbon atoms and optionally containing one or more ether or ester bonds. For a specific example, there can be mentioned, $-(CH_2)_n-$ (n represents an integer of 1 to 20); $-CH(CH_3)-$, $-CH(CH_2CH_3)-$, $-C(CH_3)_2-$, $-C(CH_3)(CH_2CH_3)-$, $-C(CH_2CH_3)_2-$, $-CH_2CH(CH_3)-$; $-(CH_2)_n-O-$ (n represents an integer of 1 to 20); $-CH(CH_3)-O-$, $-CH(CH_2CH_3)-O-$, $-C(CH_3)_2-O-$, $-C(CH_3)(CH_2CH_3)-O-$, $-C(CH_2CH_3)_2-O-$; $-(CH_2)_n-O-CH_2-$ (n represents an integer of 1 to 19); $-CH(CH_3)-O-CH_2-$, $-CH(CH_2CH_3)-O-CH_2-$, $-C(CH_3)_2-O-CH_2-$, $-C(CH_3)(CH_2CH_3)-O-CH_2-$, $-C(CH_2CH_3)_2-O-CH_2-$, $-(CH_3)_2-OC(O)-$; $-(CH_2)_n-OC(O)-(CH_2)_m-$ (m and n are the same or different, and each represents an integer of 0 to 19, provided that $0 \leq m+n \leq 19$); $-(CH_2)_n-C(O)O-(CH_2)_m-$ (m and n each represents an integer of 0 to 19, provided that 0≦m+n≦19); —CH$_2$—C(O)O—(CH$_2$)$_2$—O—CH$_2$—, —CH(CH$_3$)—C(O)O—(CH$_2$)$_2$—O—CH$_2$—, —CH(CH$_2$CH$_3$)—C(O)O—(CH$_2$)$_2$—O—, —C(CH$_3$)$_2$—C(O)O—, —C(CH$_3$)(CH$_2$CH$_3$)—C(O)O— and —C(CH$_2$CH$_3$)$_2$—C(O)O—.

Further, R$^3$ may contain a benzene ring. In this case, there can be mentioned, o-, m-, or p-C$_6$H$_4$—, o-, m-, p-C$_6$H$_4$—CH$_2$—, o-, m-, or p-C$_6$H$_4$—O—, o-, m-, or p-C$_6$H$_4$—O—CH$_2$—, o-, m-, or p-C$_6$H$_4$—O—CH(CH$_3$)—, o-, m-, or p-C$_6$H$_4$—O—C(CH$_3$)$_2$—; o-, m-, or p-C$_6$H$_4$—(CH$_2$)$_n$— (n represents an integer of 0 to 14); o-, m-, or p-C$_6$H$_4$—O—(CH$_2$)$_n$— (n represents an integer of 0 to 14); o-, m-, or p-CH$_2$—C$_6$H$_4$—, o-, m-, or p-CH$_2$—C$_6$H$_4$—CH$_2$—, o-, m-, or p-CH$_2$—C$_6$H$_4$—O—, o-, m-, or p-CH$_2$—C$_6$H$_4$—O—CH$_2$—, o-, m-, or p-CH$_2$—C$_6$H$_4$—O—CH(CH$_3$)—, o-, m-, or p-CH$_2$—C$_6$H$_4$—O—C(CH$_3$)$_2$—, o-, m-, or p-CH$_2$—C$_6$H$_4$—(CH$_2$)$_n$— (n represents an integer of 0 to 13); o-, m-, or p-CH$_2$—C$_6$H$_4$—O—(CH$_2$)$_n$— (n represents an integer of 0 to 13); o-, m-, or p-C$_6$H$_4$—C(O)O—; o-, m-, or p-CH$_2$—C$_6$H$_4$—C(O)O-; and o-, m-, or p-C(O)—C$_6$H$_4$—C(O)O—(CH$_2$)$_n$— (n represents an integer of 0 to 12).

Among them, as a preferred example, there can be mentioned a divalent organic compound represented by the general formula (2);

—C$_6$H$_4$—(CH$_2$)$_n$— (2).

In this formula, C$_6$H$_4$ represents phenylene and n represents an integer of 0 to 14.

Additionally, the above R$^3$ may be a divalent organic group represented by the general formula (3);

—C(O)—R$^5$— (3).

In this case, the above general formula (1) can be represented by the above general formula (1'). In this formula, R$^5$ represents a direct bond or a divalent organic group having 1 to 19 carbon atoms and optionally containing one or more ether or ester bonds. As said divalent organic group, all the species mentioned for R$^3$can be employed. Preferred R$^5$ is a direct bond or a divalent group represented by the general formula (4);

—(CH$_2$)$_n$— (4).

In this formula, n represents an integer of 1 to 19.

In the above general formula (1) or (1'), R$^4$ represents hydrogen, an alkyl group having 1 to 10 carbon atoms, an aryl group having 6 to 10 carbon atoms, or an aralkyl group having 7 to 10 carbon atoms. Among them, from the standpoint of reactivity of Polymer (A) in case of using as a curable resin, hydrogen or methyl group is preferred.

As a vinyl monomer used for producing a main chain of the vinyl polymer of the present invention, it is not particularly limited but includes various monomers. For example, there can be mentioned, any of (meth)acrylic acid type monomers such as (meth)acrylic acid, methyl(meth)acrylate, ethyl (meth)acrylate, n-propyl(meth)acrylate, isopropyl (meth)acrylate, n-butyl(meth)acrylate, isobutyl (meth)acrylate, tert-butyl(meth)acrylate, n-pentyl (meth) acrylate, n-hexyl(meth)acrylate, cyclohexyl (meth)acrylate, n-heptyl(meth)acrylate, n-octyl (meth)acrylate, 2-ethylhexyl (meth)acrylate, nonyl (meth)acrylate, decyl(meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl(meth)acrylate, 2-hydroxyethyl (meth)acrylate, 2-hydroxypropyl(meth)acrylate, stearyl (meth)acrylate, glycidyl(meth)acrylate, 2-aminoethyl(meth)acrylate, γ-(methacryloyloxypropyl)trimethoxysilane, (meth)acrylic acid-ethylene oxide adduct, trifluoromethylmethyl (meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl (meth)acrylate, 2-perfluorohexadecylethyl(meth)acrylate, etc.; styrene type monomers such as styrene, vinyltoluene, α-methylstyrene, chlorostyrene, styrenesulfonic acid and salts thereof, etc.; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride, and allyl alcohol. Those monomers may be used each independently or optionally a plurality of them may be copolymerized. Among them, from the standpoint of physical properties of the product polymer, styrene type monomers and (meth)acrylic acid type monomers are preferred. Still more preferred are acrylic esters and methacrylic esters. Particularly preferred is butyl acrylate.

With the vinyl polymers according to the present invention, the molecular weight distribution, that is to say the ratio of weight average molecular weight to number average molecular weight, as determined by gel permeation chromatography (GPC) is preferably not over 1.8, more preferably not over 1.6, and most preferably not over 1.3. In the context of the present invention, GPC determinations are carried out using polystyrene gel columns and, as the mobile phase, chloroform, and the number average molecular weight and the like can be calculated on a polystyrene basis.

The number average molecular weight of those vinyl polymers of the invention is not particularly restricted but preferably ranges from 500 to 100000 and more preferably 3000 to 50000. If the molecular weight is not more than 500, the inherent characteristics of the vinyl polymers may not be fully expressed. Conversely if the upper limit of 100000 is exceeded, the polymer may not be easy to work with.

Polymer (B)

Polymer (B) of the present invention is a vinyl polymer having a crosslinkable silyl group at at least one terminus of its main chain, as prepared by adding a hydrosilane compound having a crosslinkable silyl group to the above-mentioned Polymer (A).

Said hydrosilane compound having a crosslinkable silyl group is not particularly restricted but can be mentioned compounds as described hereinafter. As to the addition of said Polymer (A) to said hydrosilane compound, the detailed explanation is described hereinafter.

Polymer (C)

Polymer (C) of the present invention is a vinyl polymer having an alkenyl group of the above general formula (5) at at least one terminus of its main chain. As can be readily understood from the general formula (5), the alkenyl group is bound to the main chain of said vinyl polymer through a carbon-carbon bond not liable to be cleaved; therefore, the inherent weather resistance and other characteristics of vinyl polymers are not compromised but fully retained in the final cured product.

In the above general formula (5), $R^1$ and $R^2$ are the same groups as defined above, and examples thereof are used.

In the above general formula (5), the $R^6$ and $R^7$ may represent an electron-withdrawing group or one of them may represent an electron-withdrawing group with the other representing hydrogen, an alkyl group having 1 to 10 carbon atoms, or phenyl. Thus, at least one of $R^6$ and $R^7$ is an electron-withdrawing group, which is essential to preparation of this polymer as described hereinafter. Moreover, when both of $R^6$ and $R^7$ represent an electron-withdrawing group, these may be the same or different.

Said electron-withdrawing group is not particularly limited but includes electron-withdrawing groups known in the prior art. As an example thereof, there can be mentioned, —$CO_2R$ (ester), —$C(O)R$ (keto), —$CON(R_2)$ (amide), —COSR (thioester), —CN (nitrile), and —$NO_2$ (nitro) groups. In each formula mentioned above, R represents an alkyl group having 1 to 20 carbon atoms, an aryl group having 6 to 20 carbon atoms, or an aralkyl group having 7 to 20 carbon atoms. Among these, preferred is an alkyl group having 1 to 10 carbon atoms, or phenyl. Among these, particularly preferred are —$CO_2R$, —$C(O)R$ and —CN.

In the above general formula (5), $R^8$ represents a direct bond or a divalent organic group having 1 to 10 carbon atoms. Said divalent organic acid is not particularly restricted but includes, for example, —$(CH_2)_n$— (n represents an integer of 1 to 10), o-, m-, or p-$C_6H_4$—, (phenylene) etc. Preferred among them is —$(CH_2)_n$—. Said divalent bond may optionally contain one or more ether bonds. Thus, for example, —$CH_2$—O—$CH_2$—, —$(CH_2)_2$—O—$CH_2$—, —$(CH_2)_3$—O—$CH_2$—, —$(CH_2)_2$—O—$(CH_2)_2$—, etc. can be mentioned.

The $R^9$ in the above general formula (5) may be hydrogen, an alkyl group having 1 to 10 carbon atoms, an aryl group of 6 to 10 carbon atoms, or an aralkyl group of 7 to 10 carbon atoms. From the standpoint of reactivity of said Polymer (C) in the case of using it as a curable resin, hydrogen or methyl group is preferable.

The vinyl monomers used for producing a main chain of the above Polymer (C) are not particularly restricted but include examples thereof as mentioned above. Further, molecular weight distribution and number molecular weight of these polymers are preferably within the range described above as to Polymer (A).

Polymer (D)

Polymer (D) of the present invention is a vinyl polymer having a crosslinkable silyl group of the the above general formula (6) at at least one terminus of its main chain. It will be readily understood from the general formula (6) that since the crosslinkable silyl group is bound to the main chain of this vinyl polymer through a carbon-carbon bond not liable to be cleaved, the inherent weather resistance and other characteristics of final cured product obtained from vinyl polymers are not compromised but fully retained.

In the above general formula (6), $R^1$, $R^2$, $R^6$, $R^7$, $R^8$ and $R^9$ are the same as defined above, and examples mentioned above are used.

In the above general formula (6), the $R^{10}$ and $R^{11}$ are the same or different and each represents an alkyl group having 1 to 20 carbon atoms, an aryl group having 6 to 20 carbon atoms, an aralkyl group having 7 to 20 carbon atoms, or a triorganosiloxy group of the formula $(R')_3SiO$—. In the above formula, R' represents a univalent hydrocarbon group having 1 to 20 carbon atoms and the three R's may be the same or different. When two or more $R^{10}$ or $R^{11}$ occur, they may be the same or different. $R^{10}$ and $R^{11}$ respectively include alkyl groups such as methyl and ethyl; cycloalkyl groups such as cyclohexyl; aryl groups such as phenyl; aralkyl groups such as benzyl; and triorganosiloxy groups such as trimethylsiloxy group and triphenylsiloxy group. In the above general formula (6), Y represents hydroxyl or a hydrolyzable group. When two or more Y occur, they may be the same or different. The above-mentioned hydrolyzable group is not particularly restricted but includes a variety groups known in the prior art. As a specific example, there can be mentioned, hydrogen, halogen, alkoxy, acyloxy, ketoximate, amino, amido, acid amide, aminoxy, mercapto, alkenyloxy, and so forth. From the standpoint of hydrolyzability under mild conditions and ease of handling, alkoxy groups are preferred.

The above mentioned Y may be bound to a silicon atom in the number of 1 to 3. Further, a+mb, i.e. the total number of hydrolyzable and hydroxyl groups, is preferably within the range of 1 to 5. When two or more hydrolyzable groups are bound to a silicon group, they may be the same or different. The number of silicon atoms contained in the structure of the above general formula (6) may be one or more and in the case of silicon atoms linked via siloxane bonds, the number of silicon atoms may be up to about 20.

In this specification, when a crosslinkable silyl group is referred to as a silyl group bound to the above-mentioned group Y, the group can form the crosslink represented by —Si—O—Si— with hydroxy group or a hydroxyl group generated by hydrolysis of a hydrolyzable group.

In the above general formula (6), a represents 0, 1, 2 or 3. Said b represents 0, 1 or 2. The m represents an integer of 0 to 19, provided that a, b and m have a relationship of a+mb≧1.

The vinyl monomers used for preparing a main chain of said Polymer (D) are not particularly restricted but examples as mentioned above. Further, molecular weight distribution and number molecular weight of these polymers are preferably within the range described above as to Polymer (A).

Method for Preparing Polymer (A)

For example, Polymer (A) of the present invention can be obtained by the following method. Thus, the above polymer can be obtained by polymerizing a vinyl monomer to obtain a vinyl polymer having a group of the above general formula (7) at at least one terminus of its main chain, and then substituting an alkenyl-containing oxy anion of the above general formula (8) for the terminal halogen of this polymer.

The vinyl monomer used for the method for preparing is not particularly restricted but includes examples as described above.

The vinyl polymer having terminal structure of the above general formula (7) can be prepared by polymerization using a halogen chain transfer agent or living radical polymerization, being under energetic study these days (e.g. Matyjaszewski et al., J. Am. Chem. Soc. 1995, 117, 5614; Macromolecules 1995, 28, 7901, Science 1996, 272, 866; Sawamoto et al, Macromolecules 1995, 28, 1721). Among them, the latter method is preferred from the standpoint of the ease of control of the reaction and the chemical structure of the product.

Hereinafter, the method for preparing a vinyl polymer having terminal structure of the above general formula (7), in which the living radical polymerization is used is described in detail.

The living radical polymerization has characteristics in that vinyl monomers are polymerized using an organohalogen compound (e.g. an ester compound with a halogen atom in α-position or a compound with halogen at a benzyl group) or a sulfonyl halide compound as an initiator and a transition metal complex as an catalyst. This method enables more critical control over molecular weight and molecular weight distribution (the ratio of weight average molecular weight to number average molecular weight) of vinyl polymers (molecular weight distribution: 1.1 to 1.8), which cannot be attained by conventional radical polymerization technologies.

Said organohalogen compound or said sulfonyl halide compound comprises the carbon atom bound to the halogen atom which is bound to a carbonyl, phenyl or sulfonyl group, so that this carbon-halogen bond is easily activated, therefor these compounds can be used as an initiator. Specific examples of these compounds of include $C_6H_5$—$CH_2X$, $C_6H_5$—$C(H)(X)CH_3$, $C_6H_5$—$C(X)(CH_3)_2$ (in the formulas, $C_6H_5$ represents phenyl, and X represents chlorine, bromine or iodine); $R^{12}$—$C(H)(X)$—$CO_2R^{13}$, $R^{12}$—$C(CH_3)(X)$—$CO_2R^{13}$, $R^{12}$—$C(H)(X)$—$C(O)R^{13}$, $R^{12}$—$C(CH_3)(X)$—$C(O)R^{13}$ (in the formulas, $R^{12}$ and $R^{13}$ are the same or different, and each represents hydrogen, an alkyl group having 1 to 20 carbon atoms, an aryl group having 6 to 20 carbon atoms, or an aralkyl group having 7 to 20 carbon atoms and X represents chlorine, bromine, or iodine); and $R^{12}$—$C_6H_4$—$SO_2X$ (in the formulas, $R^{13}$ are the same as described above, and X represents chlorine, bromine or iodine).

As an initiator of the above living radical polymerization, there can be used organohalogen compounds or sulfonyl halide compounds, each having a functional group other than groups occurring the initiation of the polymerization. In this case, a vinyl polymer which comprises a functional group at one terminus of its main chain and the structure of the above general formula (7) at the other terminus is provided. As such a functional group, there can be mentioned alkenyl groups, crosslinkable groups, hydroxyl group, epoxy groups, amino groups, amide group.

The alkenyl-containing organohalogen compound is not particularly restricted but may for example be a compound having the structure of the general formula (12).

$$R^{18}R^{19}C(X)—R^{20}—R^{21}—C(R^{17})=CH_2 \quad (12)$$

(In this formula, $R^{17}$ represents hydrogen or methyl. $R^{18}$ and $R^{19}$ are same or different, and each represents hydrogen, an alkyl group having 1 to 20 carbon atoms, an aryl group having 6 to 20 carbon atoms, or an aralkyl having 7 to 20 carbon atoms. $R^{18}$ and $R^{19}$ may jointly form a linkage each other at other terminus. $R^{20}$ represents —C(O)O— (ester group), —C(O)— (keto group), or o-, m-, or p-phenylene. $R^{21}$ represents a direct bond or a divalent organic group having 1 to 20 carbon atoms and optionally containing one or more ether groups. X represents chlorine, bromine, or iodine).

As specific examples of said substituents $R^{18}$ and $R^{19}$, there can be mentioned hydrogen, methyl, ethyl, n-propyl, isopropyl, n-butyl, pentyl, hexyl and the like. $R^{18}$ and $R^{19}$ may jointly form a ring each other at other terminus.

As the alkenyl-containing organohalogen compound of the above general formula (12), there can be mentioned, for example, $XCH_2C(O)O(CH_2)_nCH=CH_2$, $H_3CC(H)(X)C(O)$
$O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

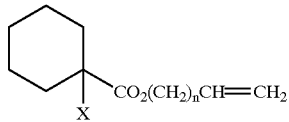

(In each formula mentioned above, X represents chlorine, bromine, or iodine; n represents an integer of 0 to 20);
$XCH_2C(O)O(CH_2)_nO(CH_2)_mCH=CH_2$,
$H_3CC(H)(X)C(O)O(CH_2)_nO(CH_2)_mCH=CH_2$,
$(H_3C)_2C(X)C(O)O(CH_2)_nO(CH_2)_mCH=CH_2$,
$CH_3CH_2C(H)(X)C(O)O(CH_2)_nO(CH_2)_mCH=CH_2$,

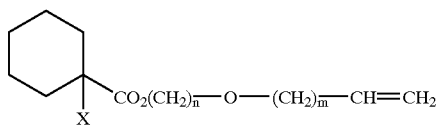

(In each formula mentioned above, X represents chlorine, bromine, or iodine; n represents an integer of 1 to 20; m represents an integer of 0 to 20);
o-, m-, or p-$XCH_2$—$C_6H_4$—$(CH_2)_n$—$CH=CH_2$,
o-, m-, or p-$CH_3C(H)(X)$—$C_6H_4$—$(CH_2)_n$—$CH=CH_2$,
o-, m-, or p-$CH_3CH_2C(H)(X)$—$C_6H_4$—$(CH_2)_n$—$CH=CH_2$ (In each formula mentioned above, X represents chlorine, bromine, or iodine; n represents an integer of 0 to 20);
o-, m-, or p-$XCH_2$—$C_6H_4$—$(CH_2)_n$—O—$(CH_2)_m$—$CH=CH_2$,
o-, m-, or p-$CH_3C(H)(X)$—$C_6H_4$—$(CH_2)_n$—O—$(CH_2)_m$—$CH=CH_2$,
o-, m-, or p-$CH_3CH_2C(H)(X)$—$C_6H_4$—$(CH_2)_n$—O—$(CH_2)_m$—$CH=CH_2$ (In each formula mentioned above, X represents chlorine, bromine, or iodine; n represents an integer of 1 to 20; m represents an integer of 0 to 20);
o-, m-, or p-$XCH_2$—$C_6H_4$—O—$(CH_2)_n$—$CH=CH_2$,
o-, m-, or p-$CH_3C(H)(X)$—$C_6H_4$—O—$(CH_2)_n$—$CH=CH_2$,
o-, m-, or p-$CH_3CH_2C(H)(X)$—$C_6H_4$—O—$(CH_2)_n$—$CH=CH_2$ (In each formula mentioned above, X represents chlorine, bromine or iodine; n represents an integer of 0 to 20),
o-, m-, or p-$XCH_2$—$C_6H_4$—O—$(CH_2)_n$—O—$(CH_2)_m$—$CH=CH_2$,
o-, m-, or p-$CH_3C(H)(X)$—$C_6H_4$—O—$(CH_2)_n$—O—$(CH_2)_m$—$CH=CH_2$, and
o-, m-, or p-$CH_3CH_2C(H)(X)$—$C_6H_4$—O—$(CH_2)_n$—O—$(CH_2)_m$—$CH=CH_2$ (In each formula mentioned above, X represents chlorine, bromine or iodine; n represents an integer of 1 to 20; m represents an integer of 0 to 20).

The alkenyl-containing organohalogen compound further includes compounds of the general formula (13).

$$H_2C=C(R^{17})—R^{21}—C(R^{18})(X)—R^{22}—R^{19} \quad (13)$$

(In this formula $R^{17}$, $R^{18}$, $R^{19}$, $R^{21}$ and X are the same as defined hereinbefore. $R^{22}$ represents a direct bond, —C(O)O— (ester group), —C(O)— (keto group), or o-, m-, or p-phenylene.)

In the above general formula (13), $R^{21}$ represents a direct bond or a divalent organic group of 1 to 20 carbon atoms (optionally containing one or more ether bonds). When $R^{21}$ represents a direct bond, the compound is an allyl halide, because the vinyl group is bound to the carbon atom bound to a halogen. In this case, the carbon-halogen bond is activated by the adjacent vinyl group so that $R^{22}$ need not necessarily be C(O)O or phenylene, for instance, but may be direct bond. When $R^{21}$ is not direct bond, $R^{22}$ is preferably C(O)O, C(O), or phenylene in order that the carbon-halogen bond may be activated.

As a specific example of the compound of the above general formula (13), there can be mentioned $CH_2=CHCH_2X$, $CH_2=C(CH_3)CH_2X$, $CH_2=CHC(H)(X)CH_3$, $CH_2=C(CH_3)C(H)(X)CH_3$, $CH_2=CHC(X)(CH_3)_2$, $CH_2=CHC(H)(X)C_2H_5$, $CH_2=CHC(H)(X)CH(CH_3)_2$, $CH_2=CHC(H)(X)C_6H_5$, $CH_2=CHC(H)(X)CH_2C_6H_5$, $CH_2=CHCH_2C(H)(X)—CO_2R$, $CH_2=CH(CH_2)_2C(H)(X)—CO_2R$, $CH_2=CH(CH_2)_3C(H)(X)—CO_2R$, $CH_2=CH(CH_2)_8C(H)(X)—CO_2R$, $CH_2=CHCH_2C(H)(X)—C_6H_5$, $CH_2=CH(CH_2)_2C(H)(X)—C_6H_5$, and $CH_2=CH(CH_2)_3C(H)(X)—C_6H_5$ (In the above formulas, X represents chlorine, bromine, or iodine and R represents an alkyl group having 1 to 20 carbon atoms, an aryl group having 6 to 20 carbon atoms, or an aralkyl group having 7 to 20 carbon atoms).

As a specific example of the alkenyl-containing sulfonyl halide compound, there can be mentioned, for example, o-, m-, or p-$CH_2=CH—(CH_2)_n—C_6H_4—SO_2X$ and o-, m-, or p-$CH_2=CH—(CH_2)_n—O—C_6H_4—SO_2X$. (In the above formulas, X represents chlorine, bromine, or iodine and n represents an integer of 0 to 20).

In the case of polymerization using the above-mentioned initiator having an alkenyl group, since an alkenyl group of the initiator may react with the polymerization growing terminus, it is necessary to pay attention to the polymerization condition such as reaction temperature, reaction time and the like.

The crosslinkable silyl-containing organohalogen compound is not particularly restricted but includes, for example, compounds having the structure of the general formula (14).

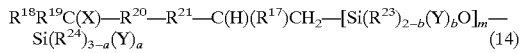
(14)

(In the formula, $R^{17}$, $R^{18}$, $R^{19}$, $R^{20}$, $R^{21}$, $R^{23}$, $R^{24}$, X, Y, a, b and m are the same as described above.)

As a specific example, there can be mentioned the compound of the above general formula (14);

$XCH_2C(O)O(CH_2)_nSi(OCH_3)_3$, $CH_3C(H)(X)C(O)O(CH_2)_nSi(OCH_3)_3$, $(CH_3)_2C(X)C(O)O(CH_2)_nSi(OCH_3)_3$, $XCH_2C(O)O(CH_2)_nSi(CH_3)(OCH_3)_2$, $CH_3C(H)(X)C(O)O(CH_2)_nSi(CH_3)(OCH_3)_2$, $(CH_3)_2C(X)C(O)O(CH_2)_nSi(CH_3)(OCH_3)_2$ (In each formula mentioned above, X represents chlorine, bromine, or iodine; n represents an integer of 0 to 20), $XCH_2C(O)O(CH_2)_nO(CH_2)_mSi(OCH_3)_3$, $H_3CC(H)(X)C(O)O(CH_2)_nO(CH_2)_mSi(OCH_3)_3$, $(H_3C)_2C(X)C(O)O(CH_2)_nO(CH_2)_mSi(OCH_3)_3$, $CH_3CH_2C(H)(X)C(O)O(CH_2)_nO(CH_2)_mSi(OCH_3)_3$, $XCH_2C(O)O(CH_2)_nO(CH_2)_mSi(CH_3)(OCH_3)_2$, $H_3CC(H)(X)C(O)O(CH_2)_nO(CH_2)_m—Si(CH_3)(OCH_3)_2$, $(H_3C)_2C(X)C(O)O(CH_2)_nO(CH_2)_m—Si(CH_3)(OCH_3)_2$, $CH_3CH_2C(H)(X)C(O)O(CH_2)_nO(CH_2)_m—Si(CH_3)(OCH_3)_2$ (In each formula mentioned above, X represents chlorine, bromine, or iodine; n represents an integer of 1 to 20; m represents an integer of 0 to 20), o-, m-, or p-$XCH_2—C_6H_4—(CH_2)_2Si(OCH_3)_3$, o-, m-, or p-$CH_3C(H)(X)—C_6H_4—(CH_2)_2Si(OCH_3)_3$, o-, m-, or p-$CH_3CH_2C(H)(X)—C_6H_4—(CH_2)_2Si(OCH_3)_3$, o-, m-, or p-$XCH_2—C_6H_4—(CH_2)_3Si(OCH_3)_3$, o-, m-, or p-$CH_3C(H)(X)—C_6H_4—(CH_2)_3Si(OCH_3)_3$, o-, m-, or p-$CH_3CH_2C(H)(X)—C_6H_4—(CH_2)_3Si(OCH_3)_3$, o-, m-, or p-$XCH_2—C_6H_4—(CH_2)_2—O—(CH_2)_3Si(OCH_3)_3$, o-, m-, or p-$CH_3C(H)(X)—C_6H_4—(CH_2)_2—O—(CH_2)_3Si(OCH_3)_3$, o-, m-, or p-$CH_3CH_2C(H)(X)—C_6H_4—(CH_2)_2—O—(CH_2)_3Si(OCH_3)_3$, o-, m-, or p-$XCH_2—C_6H_4—O—(CH_2)_3Si(OCH_3)_3$, o-, m-, or p-$CH_3C(H)(X)—C_6H_4—O—(CH_2)_3Si(OCH_3)_3$, o-, m-, or p-$CH_3CH_2C(H)(X)—C_6H_4—O—(CH_2)_3—Si(OCH_3)_3$, o-, m-, or p-$XCH_2—C_6H_4—O—(CH_2)_2—O—(CH_2)_3—Si(OCH_3)_3$, o-, m-, or p-$CH_3C(H)(X)—C_6H_4—O—(CH_2)_2—O—(CH_2)_3—Si(OCH_3)_3$, and o-, m-, or p-$CH_3CH_2C(H)(X)—C_6H_4—O—(CH_2)_2—O—(CH_2)_3Si(OCH_3)_3$ (In each formula mentioned above, X represents chlorine, bromine, or iodine).

The crosslinkable silyl-containing organohalogen compound further includes compounds of the following general formula (15).

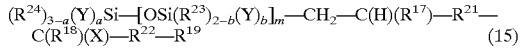
(15)

(In the formula, $R^{17}$, $R^{18}$, $R^{19}$, $R^{21}$, $R^{22}$, $R^{23}$, $R^{24}$, a, b, m, X and Y are the same as described above.)

As an example of such a compound, there can be mentioned $(CH_3O)_3SiCH_2CH_2C(H)(X)C_6H_5$, $(CH_3O)_2(CH_3)SiCH_2CH_2C(H)(X)C_6H_5$, $(CH_3O)_3Si(CH_2)_2C(H)(X)—CO_2R$, $(CH_3O)_2(CH_3)Si(CH_2)_2C(H)(X)—CO_2R$, $(CH_3O)_3Si(CH_2)_3C(H)(X)—CO_2R$, $(CH_3O)_2(CH_3)Si(CH_2)_3C(H)(X)—CO_2R$, $(CH_3O)_3Si(CH_2)_4C(H)(X)—CO_2R$, $(CH_3O)_2(CH_3)Si(CH_2)_4C(H)(X)—CO_2R$, $(CH_3O)_3Si(CH_2)_9C(H)(X)—CO_2R$, $(CH_3O)_2(CH_3)Si(CH_2)_9C(H)(X)—CO_2R$, $(CH_3O)_3Si(CH_2)_3C(H)(X)—C_6H_5$, $(CH_3O)_2(CH_3)Si(CH_2)_3C(H)(X)—C_6H_5$, $(CH_3O)_3Si(CH_2)_4C(H)(X)—C_6H_5$, and $(CH_3O)_2(CH_3)Si(CH_2)_4C(H)(X)—C_6H_5$ (In each formula mentioned above, X represents chlorine, bromine, or iodine; R represents an alkyl group having 1 to 20 carbon atoms, an aryl group having 6 to 20 carbon atoms, or an aralkyl group having 7 to 20 carbon atoms).

The above organohalogen or sulfonyl halide compound each having a hydroxyl group is not particularly restricted but includes the compound shown in the following.

$HO—(CH_2)_n—OC(O)C(H)(R)(X)$ (In the formula, X represents chlorine, bromine, or iodine; R represents hydrogen, an alkyl group having 1 to 20 carbon atoms, an aryl group having 6 to 20 carbon atoms, or an aralkyl group having 7 to 20 carbon atoms; n represents an integer of 1 to 20).

The above organohalogen or sulfonyl halide compound each having an amino group is not particularly restricted but includes the compound shown in the following.

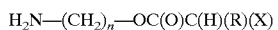

(In the formula, X represents chlorine, bromine, or iodine; R represents hydrogen, an alkyl group having 1 to 20 carbon atoms, an aryl group having 6 to 20 carbon atoms, or an aralkyl group having 7 to 20 carbon atoms; n represents an integer of 1 to 20).

The above organohalogen or sulfonyl halide compound each having an epoxy group is not particularly restricted but includes the compound shown in the following.

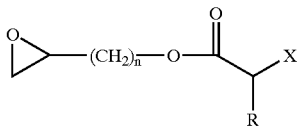

(In the formula, X represents chlorine, bromine, or iodine; R represents hydrogen, an alkyl group having 1 to 20 carbon atoms, an aryl group having 6 to 20 carbon atoms, or an aralkyl group having 7 to 20 carbon atoms; n represents an integer of 1 to 20).

In the above-mentioned living radical polymerization, when an organohalogen or sulfonyl halide compound having two or more initiation points is used as an initiator, a polymer having two or more alkenyl groups of the general formula (1) within the molecule can be obtained. Thus, a vinyl polymer having alkenyl groups at its both termini can be obtained, when an initiator having two initiation points is used for the polymerization.

As a specific example of such intiators, the following compounds can be mentioned.

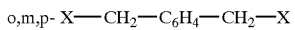 (i-1)

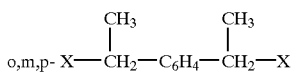 (i-2)

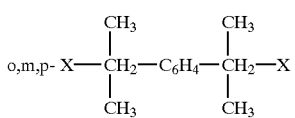 (i-3)

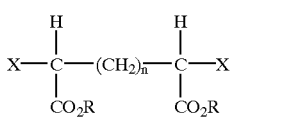 (i-4)

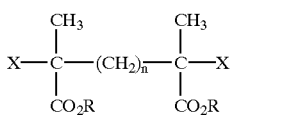 (i-5)

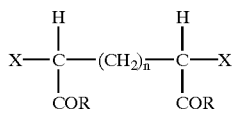 (i-6)

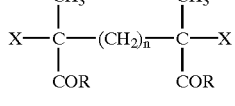 (i-7)

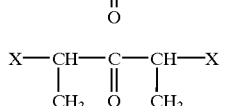 (i-8)

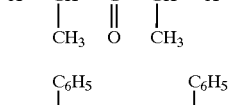 (i-9)

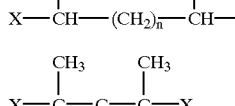 (i-10)

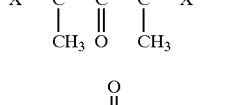 (i-11)

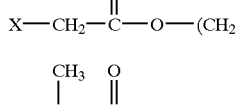 (i-12)

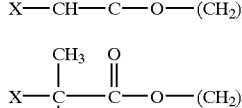 (i-13)

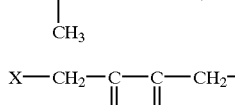 (i-14)

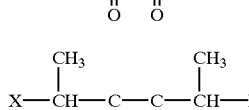 (i-15)

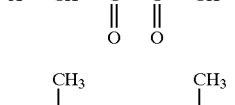 (i-16)

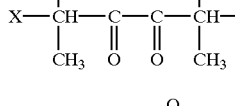 (i-17)

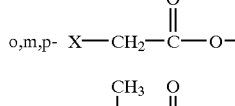 (i-18)

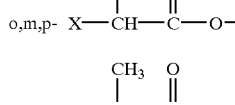 (i-19)

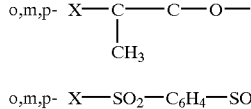 (i-20)

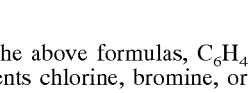 (i-21)

In the above formulas, $C_6H_4$ represents phenylene, X represents chlorine, bromine, or iodine. R represents an alkyl group having 1 to 20 carbon atoms, an aryl group having 6 to 20 carbon atoms, or an aralkyl group having 7 to 20 carbon atoms. The n represents an integer of 0 to 20.

The above-mentioned living radical polymerization can be carried out in absence of a solvent or in one of various solvents.

As the above-mentioned solvent, there can be mentioned, hydrocarbon solvents such as benzene, toluene and the like; ether solvents such as diethyl ether, tetrahydrofuran and the like; halogenated hydrocarbon solvents such as methylene chloride, chloroform and the like; ketone solvents such as acetone, methyl ethyl ketone, methyl isobutyl ketone and the like; alcohol solvents such as methanol, ethanol, propanol, isopropanol, n-butyl alcohol, tert-butyl alcohol and the like; nitrile solvents such as acetonitrile, propyonitrile, benzonitrile and the like; ester solvents such as ethyl acetate, butyl acetate and the like; and carbonate solvents such as ethylene carbonate, propyrene carbonate and the like. These solvents can be used independently or in combination of two or more kinds thereof. The above-mentioned polymerizarion can be carried out within the temperature range of room temperature to 200° C., preferably 50 to 150° C.

The transition metal complex compounds used as a catalyst in the above-mentioned living radical polymerization are not particularly restricted. The preferred metal species includes univalent copper, divalent ruthenium, divalent iron, and divalent nickel. Among them, copper complexes are preferable. The copper (I) compound includes cuprous chloride, cuprous bromide, cuprous iodide, cuprous cyanide, cuprous oxide, cuprous perchlorate, and so forth. When a copper compound is used as the catalyst, a ligand such as 2,2'-bipyridyl and its derivative, 1,10-phenanthroline and its derivative, and a polyamine such as pentamethyldiethylenetriamine is added for enhanced catalytic activity. The ruthenium chloride (II) tristriphenylphosphine complex ($RuCl_2(PPh_3)_3$) is also a preferred catalyst. When such a ruthenium compound is used as the catalyst, an aluminum alkoxide or the like is added as activator. The iron (II) bis(triphenylphosphine) complex ($FeCl_2(PPh_3)_2$), nickel (II) bis(triphenylphosphine) complex ($NiCl_2(PPh_3)_2$), nickel (II) bis(tributylphosphine) complex ($NiBr_2(Pbu_3)_2$), etc. can also be used as the catalyst with advantage.

Besides the above living radical polymerization, the polymerization used for the method of the present invention may be carried out by the polymerization with a halide as a chain transfer agent (telogen). This halide includes, for example, carbon tetrachloride, carbon tetrabromide, methylene chloride, and methylene bromide.

Polymer (A) of the present invention can be prepared by substituting an alkenyl-containing oxy anion of the above general formula (8) for terminal halogen in the vinyl polymer having a group of the above general formula (7) at at least one terminus of its main chain. Hereinafter, the method of the substitution by an alkenyl-containing oxy anion is described in detail.

In the above general formula (8) representing an alkenyl-containing oxy anion, $R^3$ and $R^4$ are the same groups as defined above, and as specific examples thereof, there can be used all examples mentioned above. In particular, $R^3$ is represented by —C(O)—$R^5$—, the above general formula (8) is represented by the general formula (8').

In the above general formula (8), $M^+$ represents the counter cation of the oxy anion, thus alkali metal ions or an quaternary ammonium ion. As the alkali metal ions, there can be mentioned, lithium ion, sodium ion, and potassium ion. As the quaternary ammonium ion, there can be mentioned tetramethylammonium ion, tetraethylammonium ion, trimethylbenzylammonium ion, trimethyldodecylammonium ion, tetrabutylammonium ion, and dimethylpiperidium ion. Preferred $M^+$ is sodium ion and potassium ion.

As precursors of the oxy anion represented by the above general formula (8), there can be mentioned, $H_2C$=CH—$CH_2$—OH, $H_2C$=CH—$CH(CH_3)$—OH, $H_2C$=$C(CH_3)$—$CH_2$—OH, $H_2C$=CH—$(CH_2)_n$—OH (n represents an integer of 2 to 20), $H_2C$=CH—$CH_2$—O—$(CH_2)_2$—OH, $H_2C$=CH—C(O)O—$(CH_2)_2$—OH, $H_2C$=$C(CH_3)$—C(O)O—$(CH_2)_2$—OH, o-, m-, or p-$H_2C$=CH—$C_6H_4$—OH, o-, m-, or p-$H_2C$=CH—$CH_2$—$C_6H_4$—OH, o-, m-, or p-$H_2C$=CH—$CH_2$—O—$C_6H_4$—OH, o-, m-, or p-$H_2C$=CH—$C_6H_4$—$CH_2$—OH, o-, m-, or p-$H_2C$=CH—$CH_2$—$C_6H_4$—$CH_2$—OH, o-, m-, or p-$H_2C$=CH—$CH_2$—O—$C_6H_4$—$CH_2$—OH.

Further, as precursors of the alkenyl-containing oxy anion represented by the above general formula (8), there can be mentioned, $H_2C$=CH—C(O)—OH, $H_2C$=$C(CH_3)$—C(O)—OH, $H_2C$=CH—$CH_2$—C(O)—OH, $H_2C$=CH—$(CH_2)_n$—C(O)—OH (n represents an integer of 2 to 20), $H_2C$=CH—$(CH_2)_n$—OC(O)—$(CH_2)_m$—C(O)—OH (m and n are the same or different, and each represents an integer of 0 to 19), o-, m-, or p-$H_2C$=CH—$C_6H_4$—C(O)—OH, o, m-, or p-$H_2C$=CH—$CH_2$—$C_6H_4$—C(O)—OH, o-, m-, or p-$H_2C$=CH—$CH_2$—O—$C_6H_4$—C(O)—OH, and o-, m-, or p-$H_2C$=CH—$(CH_2)_n$—OC(O)—$C_6H_4$—C(O)—OH (n represents an integer of 0 to 13). These compounds can be represented by the general formula (8').

The alkenyl-containing oxy anion represented by the above general formula (8) can be prepared by allowing a basic compound to react with any of the above precursors. The basic compound to be used includes a variety of basic compounds, such as sodium methoxide, potassium methoxide, lithium methoxide, sodium ethoxide, potassium ethoxide, lithium ethoxide, sodium tert-butoxide, potassium tert-butoxide, sodium carbonate, potassium carbonate, lithium carbonate, sodium hydrogencarbonate, sodium hydroxide, potassium hydroxide, sodium hydride, potassium hydride, methyllithium, ethyllithium, n-butyllithium, tert-butyllithium, lithium diisopropylamide, lithium hexamethyldisilazide; alkylamines, e.g. trimethylamine, triethylamine, tributylamine, etc.; polyamines such as tetramethylethylenediamine, pentamethyldiethylenetriamine, etc.; and pyridine compounds such as pyridine and picoline.

The ratio of the basic compound to the precursor ranges from 0.5 to 5 equivalents, preferably 0.8 to 1.2 equivalents.

As a solvent used for the reaction between said precursor and said basic compound, there can be mentioned, for example, hydrocarbon solvents such as benzene, toluene and the like; ether solvents such as diethyl ether, tetrahydrofuran and the like; halogenated hydrocarbon solvents such as methylene chloride, chloroform and the like; ketone solvents such as acetone, methyl ethyl ketone, methyl i-butyl ketone and the like; alcohol solvents such as methanol, ethanol, propanol, isopropanol, n-butyl alcohol, tert-butyl alcohol and the like; nitrile solvents such as acetonitrile, propyonitrile, benzonitrile and the like; ester solvents such as ethyl acetate, butyl acetate and the like; carbonate solvents such as ethylene carbonate, propyrene carbonate and the like; and amide solvents such as dimethyl formamide, dimethyl acetoamide and the like. These solvents can be used independently or in combination of two or more kinds thereof.

Further, a method for preparing the alkenyl-containing oxy anion of the above general formula (8) is now described in detail. When, for example, o-, m-, or p-$H_2C$=CH—

CH$_2$—C$_6$H$_4$—OH (allyl phenol) is used as said precursor, the method comprises adding a basic compound, e.g. potassium tert-butoxide, to a reactor in an inert gas atmosphere, dispersing the same in a solvent, e.g. dimethylacetamide. Adding an equimolar amount of said allylphenol, the reaction is conducted at room temperature to 70° C. for 30 minutes to 1 hour, whereby the acid proton is replaced by potassium ion to give the desired oxy anion.

Causing an alkylamine or a pyridine compound to act directly on said precursor can prepare the alkenyl-containing oxy anion in which M$^+$ is a quaternary ammonium ion. An alternative method comprises preparing the oxy anion in which M$^+$ is an alkali metal ion in the manner as mentioned above and causing a quaternary ammonium halide to act upon this anion. As an example of the above quaternary ammonium halide, there can be mentioned tetramethylammonium halides, tetraethylammonium halides, trimethylbenzylammonium halides, trimethyldodecylammonium halides, and tetrabutylammonium halides.

The alkenyl-containing oxy anion of the above general formula (8) as prepared in the above manner is allowed to react with the above vinyl polymer having the terminal structure of the above general formula (7), as prepared by the polymerization method described hereinbefore, to give Polymer (A). This reaction can be carried out in a solvent, such as those mentioned above, at temperatures of 0 to 150° C. The proportion of the alkenyl-containing oxy anion of the above general formula (8) generally ranges from 1 to 5 equivalents and preferably 1 to 1.2 equivalents relative to the terminal structure of the above general formula (7).

Method for Preparing Polymer (B)

The vinyl polymer having a crosslinkable silyl group at a terminus of its main chain, so called Polymer (B) of the present invention, can also be prepared by adding a crosslinkable silyl-containing hydrosilane compound represented by the general formula (9) to the vinyl polymer having an alkenyl group at a terminus of its main chain, so called Polymer (A).

In the general formula (9), R$^{10}$, R$^{11}$, Y, a, b and m are the same groups described above.

As specific example of the compound of the general formula (9), there can be mentioned, for example, HSiCl$_3$, HSi(CH$_3$)$_2$Cl, HSi(CH$_3$)$_2$Cl, HSi(OCH$_3$)$_3$, HSi(CH$_3$)(OCH$_3$)$_2$, HSi(CH$_3$)$_2$OCH$_3$, HSi(OC$_2$H$_5$)$_3$, HSi(CH$_3$)(OC$_2$H$_5$)$_2$, HSi(CH$_3$)$_2$OC$_2$H$_5$, HSi(OC$_3$H$_7$)$_3$, HSi(C$_2$H$_5$)(OCH$_3$)$_2$, HSi(C$_2$H$_5$)$_2$OCH$_3$, HSi(C$_6$H$_5$)(OCH$_3$)$_2$, HSi(C$_6$H$_5$)$_2$(OCH$_3$), HSi(CH$_3$)(OC(O)CH$_3$)$_2$, HSi(CH$_3$)$_2$O—[Si(CH$_3$)$_2$O]$_2$—Si(CH$_3$)(OCH$_3$)$_2$, and HSi(CH$_3$)[O—N=C(CH$_3$)$_2$]$_2$ (In the above formulas, C$_6$H$_5$ represents phenyl).

Among such hydrosilane compounds represented by the general formula (9), those of the following general formula (9');

(In the formula, R$^8$, Y and a are the same as defined hereinbefore) are particularly preferred from the standpoint of availability.

When such a hydrosilyl-containing compound having a crosslinkable silyl group is subjected to addition reaction with said vinyl polymer having an alkenyl group, a hydrosilylation catalyst described hereinafter can be employed.

Method for Preparing Polymer (C)

Polymer (C) of the present invention can be prepared by, for example, the method described in the following. Thus, the above mentioned polymer can be prepared by preparing the vinyl polymer having a group of the above general formula (7) at at least one terminus of its main chain by the above-mentioned method, and then substituting the alkenyl-containing cabanion of the general formula (10) for the terminal halogen of this polymer.

In the general formula (10) representing the alkenyl-containing group, the R$^6$, R$^7$, R$^8$, R$^9$ and M$^+$ are the same groups as defined hereinbefore. As specific examples, there can be mentioned all examples mentioned above.

The negative charge in the carbanion of the general formula (10) is in a delocalized state owing to binding one or two members of electron-withdrawing groups to its carbon atom. The delocalized carbanion is more stable than the localized carbanion. Moreover, because of its milder reactivity, it reacts selectively with the terminal halogen of the above general formula (7) and does not react with the other reactive groups such as ester group. Therefore, an alkenyl group can be introduced into the chain terminus with high efficiency.

The alkenyl-containing carbanion represented by the general formula (10) can be obtained by allowing a basic compound to react with its precursor to thereby abstract the active proton.

As said basic compounds, there can be mentioned examples described above. The amount of the basic compound may be equimolar to a small excess relative to the precursor and is preferably 1 to 1.2 equivalents.

As said precursor, there can be mentioned the following compounds; H$_2$C=CH—CH(CO$_2$CH$_3$)$_2$, H$_2$C=CH—CH(CO$_2$C$_2$H$_5$)$_2$, H$_2$C=CH—(CH$_2$)$_n$CH(CO$_2$CH$_3$)$_2$, H$_2$C=CH—(CH$_2$)$_n$CH(CO$_2$C$_2$H$_5$)$_2$, o-, m-, or p-H$_2$C=CH—C$_6$H$_4$—CH(CO$_2$CH$_3$)$_2$, o-, m-, or p-H$_2$C=CH—C$_6$H$_4$—CH(CO$_2$C$_2$H$_5$)$_2$, o-, m-, or p-H$_2$C=CH—C$_6$H$_4$—CH$_2$CH(CO$_2$CH$_3$)$_2$, o-, m-, or p-H$_2$C=CH—C$_6$H$_4$—CH$_2$CH(CO$_2$C$_2$H$_5$)$_2$, H$_2$C=CH—CH(C(O)CH$_3$)(CO$_2$C$_2$H$_5$), H$_2$C=CH—(CH$_2$)$_n$CH(C(O)CH$_3$)(CO$_2$C$_2$H$_5$), o-, m-, or p-H$_2$C=CH—C$_6$H$_4$—CH(C(O)CH$_3$)(CO$_2$C$_2$H$_5$), o-, m-, or p-H$_2$C=CH—C$_6$H$_4$—CH$_2$CH(C(O)CH$_3$)(CO$_2$C$_2$H$_5$), H$_2$C=CH—CH(C(O)CH$_3$)$_2$, H$_2$C=CH—(CH$_2$)$_n$CH(C(O)CH$_3$)$_2$, o-, m-, or p-H$_2$C=CH—C$_6$H$_4$—CH(C(O)CH$_3$)$_2$, o-, m-, or p-H$_2$C=CH—C$_6$H$_4$—CH$_2$CH(C(O)CH$_3$)$_2$, H$_2$C=CH—CH(CN)(CO$_2$C$_2$H$_5$), H$_2$C=CH—(CH$_2$)$_n$CH(CN)(CO$_2$C$_2$H$_5$), o-, m-, or p-H$_2$C=CH—C$_6$H$_4$—CH(CN)(COC$_2$H$_5$), o-, m-, or p-H$_2$C=CH—C$_6$H$_4$—CH$_2$CH(CN)(CO$_2$C$_2$H$_5$), H$_2$C=CH—CH(CN)$_2$, H$_2$C=CH—(CH$_2$)$_n$CH(CN)$_2$, o-, m-, or p-H$_2$C=CH—C$_6$H$_4$—CH(CN)$_2$, o-, m-, or p-H$_2$C=CH—C$_6$H$_4$—CH$_2$CH(CN)$_2$, H$_2$C=CH—(CH$_2$)$_2$NO$_2$, o-, m-, or p-H$_2$C=CH—C$_6$H$_4$—CH$_2$NO$_2$, o-, m-, or p-H$_2$C=CH—C$_6$H$_4$—CH$_2$CH$_2$NO$_2$, H$_2$C=CH—CH(C$_6$H$_5$)(COC$_2$H$_5$), H$_2$C=CH—(CH$_2$)$_n$CH(C$_6$H$_5$)(CO$_2$C$_2$H$_5$), o-, m-, or p-H$_2$C=CH—C$_6$H$_4$—CH(C$_6$H$_5$)(CO$_2$C$_2$H$_5$), and o-, m-, or p-H$_2$C=CH—C$_6$H$_4$—CH$_2$CH(C$_6$H$_5$)(CO$_2$C$_2$H$_5$). In the above formulas, n represents an integer of 1 to 10. C$_6$H$_4$ represents phenylene, and C$_6$H$_5$ represents phenyl.

As the solvent used for the reaction between said precursor and said base compound, there can be mentioned, hydrocarbon solvents such as benzene, toluene and the like; ether solvents such as diethyl ether, tetrahydrofuran and the like; halogenated hydrocarbon solvents such as methylene chloride, chloroform and the like; ketone solvents such as acetone, methyl ethyl ketone, methyl isobutyl ketone and the like; alcohol solvents such as methanol, ethanol, propanol, isopropanol, n-butyl alcohol, tert-butyl alcohol and the like;

nitrile solvents such as acetonitrile, propyonitrile, benzonitrile and the like; ester solvents such as ethyl acetate, butyl acetate and the like; carbonate solvents such as ethylene carbonate, propyrene carbonate and the like; and amino solvents such as dimethyl formamide, dimethyl acetoamide and the like. These solvents can be used independently or in combination of two or more kinds thereof.

A method for preparing the alkenyl-containing carbanion of the general formula (10) is now described in detail. When, for example, $H_2C=CH-CH_2CH(CO_2C_2H_5)_2$ (diethyl allylmalonate) is used as said precursor, the method comprises adding the basic compound, e.g. potassium tert-butoxide, to a reactor in an inert gas atmosphere to disperse it in an ether solvent, e.g. v tetrahydrofuran. Adding an equimolar amount of said diethyl allylmalonate to this disperse solvent, the reaction is conducted at a room temperature to its reflex temperature for 10 minutes to 1 hour, whereby the acid proton is abstracted and replaced by potassium ion to give the carbanion.

The carbanion in which $M^+$ is a quaternary ammonium ion can be produced by preparing the carbanion in which $M^+$ is an alkali metal ion as above in the manner described above and causing a quaternary ammonium halide to act upon the anion. As said quaternary ammonium halide, there can be mentioned tetramethylammonium halide, tetraethylammonium halide, trimethylbenzylammonium halide, trimethyldodecylammonium halide, and tetrabutylammonium halide.

The alkenyl-containing carbanion of the general formula (10) as prepared in the above manner is allowed to react with the vinyl polymer having a terminal structure of the above general formula (7) to give Polymer (C). This reaction can be carried out in the above-mentioned solvent at temperatures of 0 to 150° C. The proportion of the carbanion of the general formula (10) is equimolar to small excess, preferably 1 to 1.2 equivalents, relative to the terminal halogen of the above general formula (7).

Method for Preparing Polymer (D)

Polymer (D) of the present invention can be prepared by, for example, the method in the following. Thus, said polymer can be obtained by preparing said vinyl polymer having a group of the above general formula (7) at at least one terminus of its main chain in the manner as mentioned above, and substituting an crosslinkable silyl-containing carbanion represented by the following general formula (11) for the terminal halogen of this polymer.

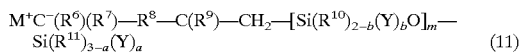

(11)

In the formula, $R^6$ to $R^{11}$, Y, a, b, m and $M^+$ are the same groups as defined above.

This method is based on the same methodology as that of the above-mentioned method for preparation of Polymer (C).

The carbanion of the above general formula (11) can be obtained by allowing a basic compound to react with its precursor to thereby abstract the active proton.

As the precursor of the carbanion represented by the above general formula (11), there can be mentioned the following compounds; $(CH_3O)_3Si(CH_2)_n-CH(CO_2C_2H_5)_2$, $(CH_3O)_3Si(CH_2)_nCH$ $(CO_2CH_3)_2$, o-, m-, or p-$(CH_3O)_3SiCH_2CH_2-C_6H_4-CH(CO_2CH_3)_2$, o-, m-, or p-$(CH_3O)_3SiCH_2CH_2-C_6H_4-CH(CO_2C_2H_5)_2$, o-, m-, or p-$(CH_3O)_3SiCH_2CH_2-C_6H_4-CH_2CH(CO_2CH_3)_2$, o-, m-, or p-$(CH_3O)_3SiCH_2CH_2-C_6H_4-CH_2CH(CO_2C_2H_5)_2$, $(CH_3O)_3Si(CH_2)_n-CH(C(O)CH_3)(CO_2CH_3)$, $(CH_3O)_3Si$ $(CH_2)_n-CH(C(O)CH_3)(CO_2C_2H_5)$, o-, m-, or p-$(CH_3O)_3SiCH_2CH_2-C_6H_4-CH(C(O)CH_3)(CO_2C_2H_5)$, o-, m-, or p-$(CH_3O)_3SiCH_2CH_2-C_6H_4-CH_2CH(C(O)CH_3)(CO_2C_2H_5)$, $(CH_3O)_3Si(CH_2)_nCH(C(O)CH_3)_2$, o-, m-, or p-$(CH_3O)_3SiCH_2CH_2-C_6H_4-CH(C(O)CH_3)_2$, o-, m-, or p-$(CH_3O)_3SiCH_2CH_2-C_6H_4-CH_2CH(C(O)CH_3)_2$, $(CH_3O)_3Si(CH_2)_nCH(CN)(CO_2C_2H_5)$, o-, m-, or p-$(CH_3O)_3SiCH_2CH_2-C_6H_4-CH(CN)(CO_2C_2H_5)$, o-, m-, or p-$(CH_3O)_3SiCH_2CH_2-C_6H_4-CH_2CH(CN)(CO_2C_2H_5)$, $(CH_3O)_3Si(CH_2)_nCH(CN)_2$, o-, m-, or p-$(CH_3O)_3SiCH_2CH_2-C_6H_4-CH(CN)_2$, o-, m-, or p-$(CH_3O)_3SiCH_2CH_2-C_6H_4-CH_2CH(CN)_2$, $(CH_3O)_3Si(CH_2)_nCH_2NO_2$, o-, m-, or p-$(CH_3O)_3SiCH_2CH_2-C_6H_4-CH_2NO_2$, o-, m-, or p-$(CH_3O)_3SiCH_2CH_2-C_6H_4-CH_2CH_2NO_2$, $(CH_3O)_3Si(CH_2)_n-CH(C_6H_5)(CO_2C_2H_5)$, o-, m-, or p-$(CH_3O)_3SiCH_2CH_2-C_6H_4-CH(C_6H_5)$ $(CO_2C_2H_5)$, o-, m-, or p-$(CH_3O)_3SiCH_2CH_2-C_6H_4-CH_2CH(C_6H_5)(C_2C_2H_5)$, $(CH_3O)_2(CH_3)Si(CH_2)_n-CH(CO_2C_2H_5)_2$, $(CH_3O)_2(CH_3)Si(CH_2)_nCH(C_2CH_3)_2$, o-, m-, or p-$(CH_3O)_2(CH_3)SiCH_2CH_2-C_6H_4-CH(CO_2CH_3)_2$, o-, m-, or p-$(CH_3O)_2(CH_3)SiCH_2CH_2-C_6H_4-CH(CO_2C_2H_5)_2$, o-, m-, or p-$(CH_3O)_2(CH_3)SiCH_2CH_2-C_6H_4-CH_2CH(C_3H_5)_2$, o-, m-, or p-$(CH_3O)_2(CH_3)SiCH_2CH_2-C_6H_4-CH_2CH(C_2C_2H_5)_2$, $(CH_3O)_2(CH_3)Si(CH_2)_n-CH(C(O)CH_3)(CO_2CH_3)$, $(CH_3O)_2(CH_3)Si(CH_2)_n-CH(C(O)CH_3)(CO_2C_2H_5)$, o-, m-, or p-$(CH_3O)_2(CH_3)SiCH_2CH_2-C_6H_4-CH(C(O)CH_3)(CO_2C_2H_5)$, o-, m-, or p-$(CH_3O)_2(CH_3)SiCH_2CH_2-C_6H_4-CH_2CH(C(O)CH_3)-(CO_2C_2H_5)$, $(CH_3O)_2(CH_3)Si(CH_2)_nCH(C(O)CH_3)_2$, o-, m-, or p-$(CH_3O)_2(CH_3)SiCH_2CH_2-C_6H_4-CH(C(O)CH_3)_2$, o-, m-, or p-$(CH_3O)_2(CH_3)SiCH_2CH_2-C_6H_4-CH_2CH(C(O)CH_3)_2$, $(CH_3O)_2(CH_3)Si(CH_2)_nCH(CN)(CO_2C_2H_5)$, o-, m-, or p-$(CH_3O)_2(CH_3)SiCH_2CH_2-C_6H_4-CH(CN)(CO_2C_2H_5)$, o-, m-, or p-$(CH_3O)_2(CH_3)SiCH_2CH_2-C_6H_4-CH_2CH(CN)(CO_2C_2H_5)$, $(CH_3O)_2(CH_3)Si(CH_2)_nCH(CN)_2$, o-, m-, or p-$(CH_3O)_2(CH_3)SiCH_2CH_2-C_6H_4-CH(CN)_2$, o-, m-, or p-$(CH_3O)_2(CH_3)SiCH_2CH_2-C_6H_4-CH_2CH(CN)_2$, $(CH_3O)_2(CH_3)Si(CH_2)_nCH_2NO_2$, o-, m-, or p-$(CH_3O)_2(CH_3)SiCH_2CH_2-C_6H_4-CH_2NO_2$, o-, m-, or p-$(CH_3O)_2(CH_3)SiCH_2CH_2-C_6H_4-CH_2CH_2NO_2$, $(CH_3O)_2(CH_3)Si(CH_2)_n-CH(C_6H_5)(CO_2C_2H_5)$, o-, m-, or p-$(CH_3O)_2(CH_3)SiCH_2CH_2-C_6H_4-CH(C_6H_5)(CO_2C_2H_5)$, and o-, m-, or p-$(CH_3O)_2(CH_3)SiCH_2CH_2-C_6H_4-CH_2CH(C_6H_5)(CO_2C_2H_5)$.
(In the above formulas, n represents an integer of 1 to 10.)

By allowing the above basic compound to react with any of these precursors, the carbanion of the above general formula (11) is provided, and then, the carbanion is subjected to react with the vinyl polymer having a terminal halogen of the above general formula (7) to provide the objective Polymer (D).

Polymer (D) can also be prepared by the following method. Thus, said polymer can be obtained by adding the hydrosilane compounds having a crosslinkable silyl group represented by the general formula (9) to the vinyl polymer having an alkenyl group at a terminus of its main chain, so called Polymer (C). In this i case, Polymer (C) can be used independently or in combination of two or more kinds thereof.

When said hydrosilane compounds having a crosslinkable silyl group are added to Polymer (C), a hydrosilylation catalyst described hereinafter can be used.

Curable Composition Comprising Polymer (A) or (C)

From the vinyl polymer having an alkenyl group at a terminus of its main chain of the present invention, a curable composition having it as a principal component can be obtained. The vinyl polymer having an alkenyl group at a terminus of its main chain of the present invention is referred to as Polymer (A) and Polymer (C). Thus, the curable composition of the present invention comprises (a) Polymer (A) or Polymer (C) and (b) a hydrosilyl-containing compound.

The vinyl polymers of the component (a) can be used each alone or in combination of two or more kinds thereof. The molecular weight of the component (a) is not particularly restricted but is preferably within the range of 500 to 100000 and more preferably 3000 to 50000. If the molecular weight is not more than 500, the inherent properties of the vinyl polymer may not be effectively expressed. If it is not less than 100000, the polymer has pretty high viscosity or low solubility so that it may not be easy to work with.

The hydrosilyl-containing compound of the component (b) is not particularly restricted but includes a variety of compounds. Thus, for example, linear polysiloxanes of the following general formula (16) or (17);

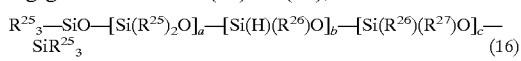

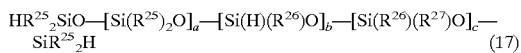

(In the above general formulas, $R^{25}$ and $R^{26}$ are the same or different, and each represents an alkyl group having 1 to 6 carbon atoms, or phenyl; $R^{27}$ represents an alkyl group having 1 to 10 carbon atoms, or an aralkyl group having 7 to 10 carbon atoms; a represents an integer of 0 to 100; b represents an integer of 2 to 100; and c represents an integer of 0 to 100.); and cyclic polysiloxanes of the following general formula (18);

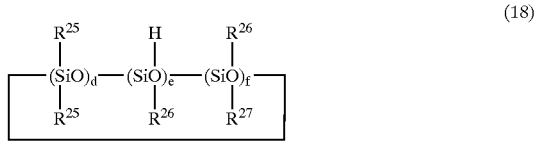

(wherein $R^{25}$, $R^{26}$ and $R^{27}$ are the same groups as defined above; d represents an integer of 0 to 8; e represents an integer of 2 to10; f represents an integer of 0to 8;and d, e and f satisfies $3 \leq d+e+f \leq 10$) can be used.

Those compounds can be used each alone or in a combination of two or more kinds thereof. From the standpoint of compatibility with the vinyl polymer, phenyl-containing linear polysiloxanes are preferable. As these compounds, linear polysiloxanes represented by the following general formula (19) or (20) and cyclic polysiloxanes represented by the following general formula (21) or (22) can be mentioned.

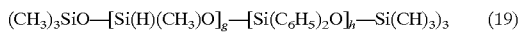

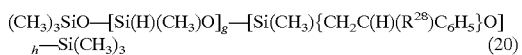

(In the formulas, $R^{28}$ represents hydrogen or methyl; g represents an integer of 2 to 100; h represents an integer of 0 to 100; $C_6H_5$ represents phenyl.)

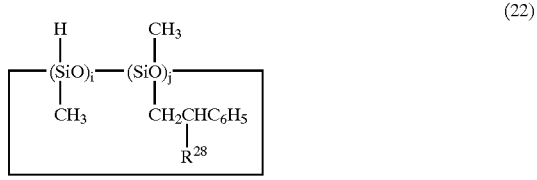

(In the above formulas, $R^{28}$ represents hydrogen or methyl; i represents an integer of 2 to 10; j represents an integer of 0 to 8; provided that $3 \leq i+j \leq 10$; $C_6H_5$ represents phenyl).

Further, as the hydrosilyl-containing compound of the component (b), the compounds can be used, which are prepared by addition reaction of a low molecular compound containing two or more alkenyl groups within molecule to the polysiloxanes of the general formulas (16) through (22) in such proportions that some hydrosilyl groups remain after the reaction. As the compound having two or more alkenyl groups within molecule, a variety of compounds can be employed. Thus, for example, hydrocarbons such as 1,4-pentadiene, 1,5-hexadiene, 1,6-heptadiene, 1,7-octadiene, 1,8-nonadiene, 1,9-decadiene, etc.; ether compounds such as O,O'-diallylbisphenol A, 3,3'-diallylbisphenol A, etc.; ester compounds such as diallyl phthalate, diallyl isophthalate, triallyl trimellitate, tetraallyl pyromellitate, etc.; carbonates such as diethylene glycol diallyl carbonate etc. can be mentioned.

The desired compound can be obtained by adding a little amount of the above low molecular compound containing two or more alkenyl groups slowly dropwise to any of the above polysiloxanes of the general formula (16) to (22) in the presence of a hydrosilylation catalyst. Among such compounds, compounds of the following general formula are preferred from the standpoint of availability, ease of removal of the excess of hydrosilyl-containing compound used, and compatibility with the component (a) polymer.

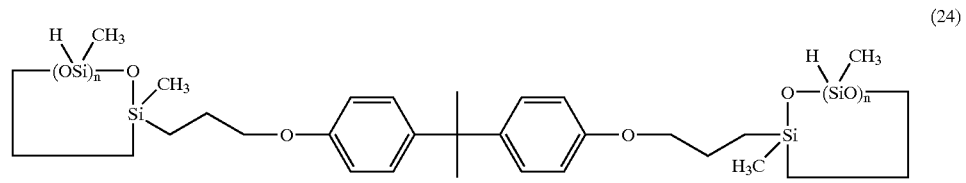

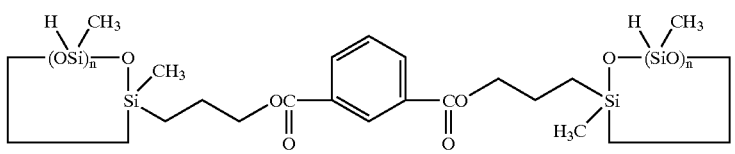

(25)

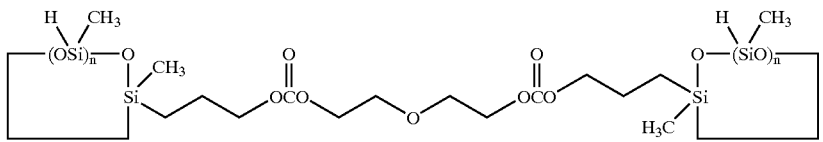

(26)

(n represents 2,3 or 4. m represents an integer of 5 to 10.)

In the curable component of the present invention, the vinyl polymer (a) and hydrosilyl-containing compound (b) can be used in any suitable ratio. However, from the standpoint of curability, the alkenyl-to-hydrosilyl molar ratio is preferably within the range of 0.2 to 5 and more preferably in the range of 0.4 to 2.5. If the above molar ratio is not less than 5, curability may be sacrificed so that the cured product be of low strength and sticky. If the ratio is smaller than 0.2, a substantial number of active hydrosilyl groups may remain in the cured product so that cracks and voids may develop, thus failing to provide a cured product with uniformity and strength.

The curing reaction between the composition (a) and the composition (b) proceeds as a mixture of them is simply heated but in order to hasten the reaction, a hydrosilylation catalyst can be added. This hydrosilylation catalyst includes radical initiators such as organic peroxides and azo compounds and transition metal catalysts.

The radical initiator mentioned above is not particularly restricted but includes a variety of compounds. Thus, for example, dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butylcumyl peroxide, α,α'-bis(t-butylperoxy)-isopropylbenzene, etc.; diacyl peroxides such as dibenzoyl peroxide, p-chlorobenzoyl peroxide, m-chlorobenzoyl peroxide, 2,4-dichlorobenzoyl peroxide, lauroyl peroxide, etc.; peracid esters such as t-butyl perbenzoate etc.; peroxydicarbonates such as diisopropyl perdicarbonate, di-2-ethylhexyl perdicarbonate, etc.; and peroxyketals such as 1,1-di(t-butylperoxy)cyclohexane, 1,1-di(t-butylperoxy)-3,3,5-trimethylcyclohexane, etc. can be mentioned.

The transition metal catalyst includes platinum metal, a dispersion of solid platinum in a support such as alumina, silica, carbon black, or the like; chloroplatinic acid; chloroplatinic acid-alcohol, -aldehyde, and -ketone complexes; platinum-olefin complexes, platinum(0)-divinyltetramethyldisiloxane complex, and so forth. As examples of the catalyst other than platinum compounds, there can be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$, $TiCl_4$, and so forth. Those catalysts can be used each alone or in combination of two or more kinds.

The amount of the catalyst is not particularly restricted but is preferably $10^{-1}$ to $10^{-8}$ mol per mol of alkenyl group of the component (a) and more preferably $10^{-3}$ to $10^{-6}$ mol on the same basis. If the amount of the catalyst is less than $10^{-8}$ mol, the curing reaction may not proceed to a sufficient extent. On the other hand, since the hydrosilylation catalyst is expensive, it is not advisable to use not less than $10^{-1}$ mol.

In the above curable composition, when the two components (a) and (b), optionally together with said hydrosilylation catalyst, are admixed and caused to cure, there is obtained a cured product of high uniformity with excellent depth curability without involving foaming. The curing conditions are not particularly restricted but the reaction is carried out generally at 0 to 200° C., preferably 30 to 150° C., for 10 seconds to 24 hours. Particularly, a curable composition that cures in a short time of about 10 seconds to 1 hour at a high temperature of 80 to 150° C. can be obtained. The properties of the cured product are dependent on the main chain structure and molecular weight of (a) vinyl polymer and (b) hydrosilyl-containing compound but a broad spectrum of products ranging from a rubbery consistency to a resinous one can be freely designed and obtained. The uses for the cured product of the invention include sealants, adhesives, stickers, elastic adhesives, paints, powder coating materials, foams, electric/electronic potting agents, films, gaskets, various shaped articles, artificial marble, and so forth.

Curable Composition Comprising
Polymer (B) or (D)

From the vinyl polymer having a crosslinkable silyl group at a terminus of its main chain of the present invention, a curable composition having it as a principal component can be obtained. The vinyl polymer having a crosslinkable silyl group at a terminus of its main chain of the present invention is referred to as Polymer (B) and Polymer (D).

In the curable composition, the polymer as a principal component can be used each alone or in combination of two or more kinds thereof. The molecular weight thereof is not particularly restricted but is preferably within the range of 500 to 100000 and more preferably 3000 to 50000. If the molecular weight is not more than 500, the inherent properties of the vinyl polymer having a crosslinkable silyl group at a terminus of its main chain may not be effectively expressed. If it is over 100000, the polymer may not be easy to work with.

The vinyl polymer having a crosslinkable silyl group at a terminus of its main chain of the present invention cures on contact with moisture to form a three-dimensional structure. The velocity of hydrolysis depends on temperature, humidity, and the species of the hydrolyzable group. Therefore, a suitable hydrolyzable group should be selected according to the intended application. For maintaining the vinyl polymer having a crosslinkable silyl group at a terminus of its main chain, it is necessary to prevent the polymer from the contact with moisture as possible.

A curing catalyst may be added for accelerating the curing reaction. As the catalyst, there can be mentioned alkyl titanates, organosilicon titanates; tin octylate, dibutyltin dilaurate, and other carboxylic acid salts of metals; amine salts such as dibutylamine 2-ethylhexoate, and other acid or basic catalysts. The amount of the catalyst is not particularly restricted but is preferably 0.01 to 5 weight % based on the vinyl polymer of its principal component.

When said curing catalyst is optionally mixed with the vinyl polymer of its principal component and the mixture is cured, a uniform cured product is obtained. The curing conditions are not particularly restricted but the curing reaction is generally carried out at temperatures of 0 to 100° C., preferably 10 to 50° C., for about 1 hour to one week. The properties of the cured product are dependent on the main chain structure and molecular weight of the polymer but a broad spectrum of products ranging from a rubbery product to a resinous one can be selectively designed and obtained.

Specific end uses include sealants, adhesives, stickers, elastic adhesives, paints, powder coating materials, foams, electric or electronic potting agents, films, gaskets, various shaped articles, and artificial marble.

BEST MODE FOR CARRYING OUT THE INVENTION

The following reaction examples illustrate the invention in further detail but are not intended to define the scope of the invention.

EXAMPLE 1

A 30 ml autoclave was charged with methyl acrylate (7.5 ml, 7.17 g, 83.4 mmol), α,α'-dibromo-p-xylene (438 mg, 1.67 mmol), cuprous bromide (239 mg, 1.67 mmol), 2,2'-bipyridyl (518 mg, 3.34 mmol), ethyl acetate (6.0 mL), and acetonitrile (1.5 ml). The dissolved oxygen was removed by blowing nitrogen gas through the charge for at least 10 minutes. The autoclave was closed and the mixture was heated at 130° C. for 1 hour. The reaction product was diluted with ethyl acetate (20 mL) and washed 3 times with diluted hydrochloric acid and once with brine. The organic layer was dehydrated over $Na_2SO_4$ and the volatile matter was distilled off under reduced pressure to provide a poly (methyl acrylate) of the following formula (yield 6.01 g). The number average molecular weight of this polymer as determined by GPC (polystyrene basis) was 5600. The molecular weight distribution was 1.26.

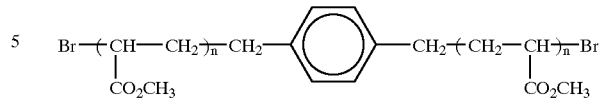

A 50 ml three-necked, round-bottomed flask equipped with a condenser was charged with potassium t-butoxide (160 mg, 1.43 mmol) and N,N-dimethylacetamide (3 mL) under nitrogen. Then, an equivalent of O-allylphenol (192 mg, 1.43 mmol) was added and the reaction was carried out at room temperature for 30 minutes. Then, a solution of the above poly(methyl acrylate) (2.0 g) in N,N-dimethylacetamide (2 mL) was added dropwise and the reaction was carried out at room temperature for 2 hours. This reaction mixture was neutralized with iced water-hydrochloric acid and extracted with ethyl acetate (30 mL). The organic layer was washed twice with diluted hydrochloric acid and once with brine. The organic layer was dehydrated over $Na_2SO_4$ and the volatile matter was distilled off under reduced pressure. The residue was dissolved in a small amount of ethyl acetate and reprecipitated from hexane to provide a poly(methyl acrylate) having an alkenyl groups at both termini of the following formula (yield 1.70 g). This product was dissolved in toluene and aluminum silicate (Kyoward 700 PEL, Kyowa Chemical) was added in an amount equal to that of the polymer. The mixture was stirred at the ref lux temperature for one hour to remove the trace impurity from the polymer. The number of alkenyl groups introduced was 1.24 per molecule of the oligomer as determined by $^1H$ NMR analysis.

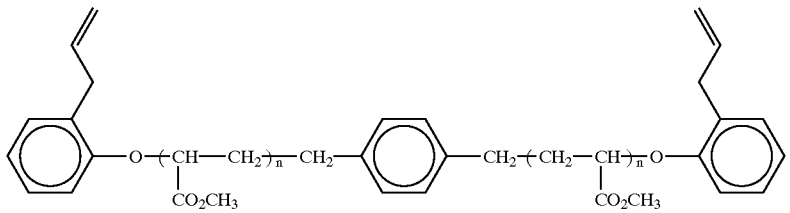

Then, the above purified poly(methyl acrylate) was dissolved in ethyl acetate (2 mL) and a polyfunctional hydrogensilicon compound of the following formula and platinum (0)-1,1,3,3-tetramethyl-1,3-divinyldisiloxane complex (8.3× $10^{-9}$ mol/L in xylene) were added to the above poly(methyl acrylate) solution, followed by thorough stirring. The amount of the polyfunctional hydrogensilicon compound was adjusted so that the molar ratio of alkenyl-to-hydrosilyl would be 1/1.2, and the amount of the platinum catalyst relative to polymer alkenyl was $10^{-3}$ molar equivalents.

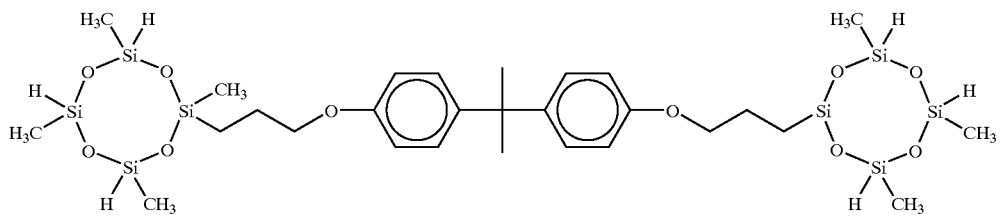

A portion of the composition thus obtained was test-cured on a hot plate at 130° C. and the gelation time was measured. The gelation time was 4 minutes. The remaining composition was cast in a mold, the volatile matter was distilled off under reduced pressure, and the residue was cured at 100° C. for 14 hours to provide a rubber-like cured product. This cured product was immersed in acetone for 24 hours and the gel fraction was determined from the change in weight. The gel fraction thus determined was 45%.

PRODUCTION EXAMPLE 1

Production of an Alkenyl-containing Carboxylic Salt-1

To 1/2 N-potassium hydroxide/ethanol (200 mL) was added undecylenic acid (18.8 g, 0.102 mol) slowly dropwise at 0° C. with constant stirring. The volatile matter was then distilled off to give a crude product. This crude product was washed with acetone and heated in vacuo to provide potassium undecylenate of the following formula as white solid (8.88 g, yield 88%).

$CH_2=CH-(CH_2)_8-CO_2^-K^+$

EXAMPLE 2

A 30 mL pressure glass autoclave was charged with n-butyl acrylate (7.5 mL, 6.72 g, 51.3 mmol), α,α'-dibromo-p-xylene (270 mg, 1.03 mmol), cuprous bromide (150 mg, 1.03 mmol), 2,2'-bipyridyl (322 mg, 2.06 mmol), ethyl acetate (6 mL), and acetonitrile (1.5 mL). The dissolved oxygen was removed by blowing nitrogen gas for 10 minutes. The autoclave was then closed and the charge was heated at 130° C. for 1.5 hours. This reaction mixture was diluted with ethyl acetate (20 mL) and the insoluble matter was filtered off. The filtrate was washed twice with diluted hydrochloric acid and once with brine. The organic layer was dehydrated over $Na_2SO_4$ and the volatile matter was distilled off to provide 5.0 g of a poly(n-butyl acrylate) having a halogen at both termini of the following formula (polymerization yield 75%). The number average molecular weight of the polymer as determined by GPC (polystyrene basis) was 5,600. The molecular weight distribution was 1.32.

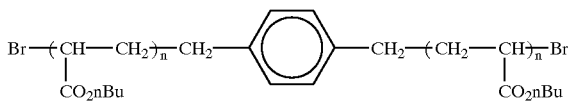

The autoclave was charged with the above halogen-terminated poly(n-butyl acrylate) (5.00 g), potassium undecylenate as synthesized in Production Example 1 (476 mg, 2.14 mmol), and N,N-dimethylacetamide (10 mL) and the reaction was carried out in a nitrogen gas atmosphere at 70° C. for 6 hours. From the reaction mixture, the volatile fraction was distilled off under reduced pressure. The residue was diluted with ethyl acetate and the insoluble matter was filtered off. The filtrate was distilled under reduced pressure to provide 4.77 g of an alkenyl-terminated poly(n-butyl acrylate) of the following formula. This product was dissolved in toluene, and aluminum silicate (Kyoward 700 PEL, Kyowa Chemical) was added in an amount equal to that of the polymer. The mixture was stirred for 2 hours to remove trace impurities from the polymer. The number of alkenyl groups introduced was 1.70 per molecule of the oligomer as determined by $^1H$ NMR analysis.

To this purified poly(butyl acrylate) were added the same polyfunctional hydrogensilicon compound and platinum catalyst as used in Example 1, and the mixture was stirred well. The amount of the polyfunctional hydrogensilicon compound was adjusted so that the molar ratio of alkenyl to hydrosilyl would be 1/1.2 and the amount of the platinum catalyst was $10^{-4}$ molar equivalents per mol of polymer alkenyl.

A portion of the composition thus obtained was test-cured on a hot plate at 130° C. and the gelation time was measured. The gelation time was 60 seconds. The remaining composition was cast in a mold, the volatile matter was distilled off under reduced pressure, and the residue was cured at 100° C. for 20 hours to provide a rubber-like cured sheet. This cured sheet was immersed in toluene for 24 hours and the gel fraction was determined from the change in weight. The gel fraction thus determined was 85%.

From the cured sheet, a No. 2 (1/3) dumbbell-shaped testpiece was punched out and subjected to a tensile test using Shimadzu Autograph (measuring conditions: 23° C., 200 mm/min.). The breaking strength was 0.23 MPa and the elongation at break was 128%.

PRODUCTION EXAMPLE 2

Production of an Alkenyl-containing Carboxylic Salt-2

In methanol (200 mL) was dissolved potassium methoxide (16.83 g, 0.240 mol), and 4-pentenoic acid (24.56 g, 0.245 mol) was added slowly dropwise at 0° C. with constant stirring. The volatile matter was then distilled off under reduced pressure to recover a crude product. This crude product was washed with ethyl acetate and heated in vacuo to provide potassium 4-petenoate of the following formula as white solid (29.2 g, yield 88%).

$CH_2=CH-(CH_2)_2-CO_2^-K^+$

EXAMPLE 3

A 500 mL pressure glass autoclave was charged with n-butyl acrylate (112 mL, 100 g, 0.78 mol), α,α'-dibromo-p-xylene (4.12 g, 15.6 mmol), cuprous bromide (2.24 g, 15.6 mmol), 2,2'-bipyridyl (4.87 g, 31.2 mmol), ethyl acetate (90 mL), and acetonitrile (22.4 mL). The dissolved oxygen was removed by blowing nitrogen gas for 10 minutes. The autoclave was then closed and the charge was heated at 130° C. for 2.0 hours. This reaction mixture was diluted with ethyl acetate (300 mL) and the insoluble solid matter was filtered off. The filtrate was diluted with ethyl acetate (200 ml) and washed twice with diluted hydrochloric acid and once with brine. The organic layer was dehydrated over $Na_2SO_4$ and the volatile matter was distilled off under reduced pressure to provide 85.9 g of a poly(n-butyl acrylate) having a halogen at both termini (polymerization yield 86%). The number average molecular weight of the polymer as determined by GPC (polystyrene basis) was 5,700. The molecular weight distribution was 1.37.

A 500 mL three-necked, round-bottomed flask equipped with a condenser was charged with the above halogen-terminated poly(n-butyl acrylate) (83.9 g), potassium 4-pentenate as synthesized in Production Example 2 (7.74 g, 56.0 mmol), and N,N-dimethylacetamide (80 mL) and the reaction was carried out in a nitrogen gas atmosphere at 70° C. for 6 hours. The reaction mixture was then diluted with ethyl acetate (200 mL) and washed three times with water and once with brine. The organic layer was dehydrated over $Na_2SO_4$ and the volatile matter was distilled off under reduced pressure to isolate the polymer. Aluminum silicate (Kyoward 700 PEL, Kyowa Chemical) was added in an amount equal to that of the polymer. The mixture was stirred at 100° C. for 2 hours to remove trace impurities from the polymer to provide an alkenyl-terminated poly(butyl acrylate) of the following formula. The number of alkenyl groups introduced was 1.73 per molecule of the oligomer as determined by $^1H$ NMR analysis.

From the above cured sheet, a No. 2(1/3) dumbbell-shaped testpiece was punched out and subjected to a tensile test using Shimadzu Autograph (measuring conditions: 23° C., 200 mm/min.). The breaking strength was 0.26 MPa and the elongation at break was 75%.

EXAMPLE 5

A 100 mL three-necked, round-bottomed flask equipped with a condenser was charged with cuprous bromide (0.625 g, 15.6 mmol), acetonitrile (5.0 mL), and pentamethyldiethylenetriamine (0.91 ml), and the flask was purged with nitrogen gas. Then, n-butyl acrylate (50 mL, 44.7 g, 0.39 mol) and diethyl 2,5-dibromoadipate (1.57 g, 4.36 mmol) were added and the mixture was stirred at 70° C. for 7 hours. This reaction mixture was diluted with ethyl acetate and treated with active alumina. The volatile matter was then distilled off under reduced pressure to provide 35.0 g of a poly(n-butyl acrylate) having a halogen at both termini of the following formula (polymerization yield 87%). The number average molecular weight of the polymer as determined by GPC (polystyrene basis) was 10,700. The molecular weight distribution was 1.15.

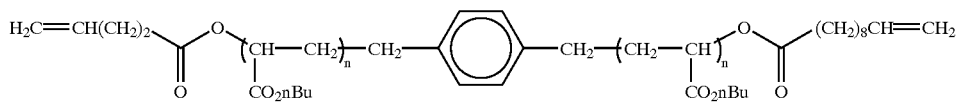

EXAMPLE 4

A 200 ml pressure glass reactor was charged with the alkenyl-terminated poly(n-butyl acrylate) obtained in Example 3 (60.0 g), dimethoxymethylhydrosilane (8.4 mL, 68.1 mmol), dimethyl orthoformate (2.5 mL, 22.9 mmol), and platinum catalyst. The amount of the platinum catalyst was $10^{-4}$ molar equivalents based on the polymer alkenyl. The mixture was heated at 100° C. for 3 hours. From this reaction mixture, the volatile matter was distilled off under reduced pressure to provide a silyl-terminated poly(n-butyl acrylate) of the following formula. The number of silyl groups introduced was 1.59 per molecule of the oligomer as determined by $^1H$ NMR analysis.

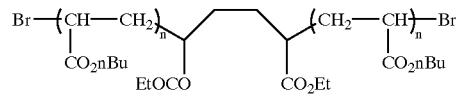

Then, a 200 mL three-necked, round-bottomed flask equipped with a condenser was charged with the above halogen-terminated poly(n-butyl acrylate) (35.0 g), potassium 4-pentenoate as synthesized in Production Example 2 (2.23 g, 16.1 mmol), and N,N-dimethylacetamide (35 mL), and the reaction was carried out in a nitrogen atmosphere at

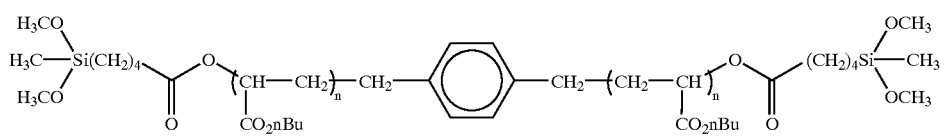

Then, this silyl-terminated poly(butyl acrylate) was mixed well with dibutyltin dimethoxide and water. The amount of the tin catalyst and that of water were 1 part by weight each relative to the polymer.

The resulting composition was cast in a mold, degassed by decompression, and cured at 50° C. for 20 hours to provide a cured sheet having rubber-like elasticity. This cured sheet was immersed in toluene for 24 hours and the gel fraction was determined from the change in weight. The gel fraction was 93%.

70° C. for 4 hours. This reaction mixture was diluted with ethyl acetate and washed serially with 2% hydrochloric acid and brine. The organic layer was dehydrated over $Na_2SO_4$ and the volatile matter was distilled off under reduced pressure to isolate the polymer. This polymer was mixed with an equal amount of aluminum silicate (Kyoward 700 PEL, Kyowa Chemical) and the mixture was stirred at 100° C. for 4 hours to provide an alkenyl-terminated poly(butyl acrylate) of the following formula. The number of alkenyl groups introduced was 1.82 per molecule of the oligomer as determined by $^1H$ NMR analysis.

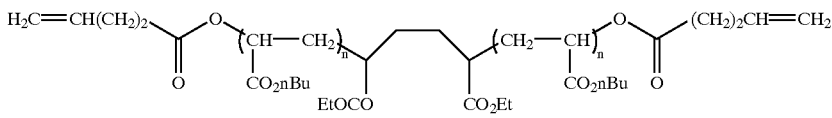

EXAMPLE 6

A 200 ml pressure glass autoclave was charged with the alkenyl-terminated poly(n-butyl acrylate) obtained in Example 5 (15.0 g), dimethoxymethylhydrosilane (1.8 mL, 14.5 mmol), dimethyl orthoformate (0.26 mL, 2.42 mmol), and platinum catalyst. The amount of the platinum catalyst was $2 \times 10^{-4}$ molar equivalents per mol of polymer alkenyl. The mixture was heated at 100° C. for 4 hours. From this reaction mixture, the volatile matter was distilled off under reduced pressure to provide a silyl-terminated poly(n-butyl acrylate) of the following formula. The number of silyl groups introduced was 1.46 per molecule of the oligomer as determined by $^1$H NMR analysis.

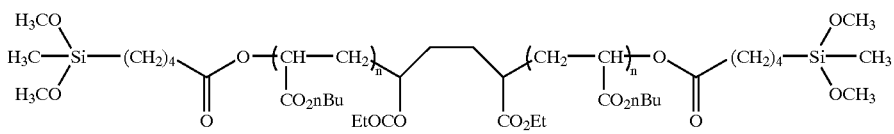

Then, this silyl-terminated poly(butyl acrylate) was mixed well with dibutyltin dimethoxide and water. The amount of the tin catalyst and that of water were 1 part by weight each relative to the polymer.

The resulting composition was cast in a mold, degassed by decompression, and cured at 50° C. for 20 hours to provide a cured sheet having rubber-like elasticity. This cured sheet was immersed in toluene for 24 hours and the gel fraction was determined from the change in weight. The gel fraction was 98%.

From the above cured sheet, a No. 2(1/3) dumbbell-shaped testpiece was punched out and subjected to a tensile test using Shimazu Autograph (measuring conditions: 23° C., 200 mm/min.). The breaking strength was 0.35 MPa and the elongation at break was 77%.

PRODUCTION EXAMPLE 3

Production of an Alkenyl-containing Carboxylic Salt-3

A 200 mL round-bottomed flask was charged with potassium t-butoxide (5.61 g, 50 mmol), and, then, methanol (50 mL) was added slowly dropwise at 0° C. Under stirring at 0° C., methacrylic acid (4.4 mL, 52.0 mmol) was added slowly dropwise to the above solution, whereupon white crystals separated out. After cooling to room temperature, the white crystals were harvested by filtration and dried in vacuo at room temperature to provide potassium methacrylate of the following formula (3.31 g, yield 53%).
$CH_2=C(CH_3)-CO_2^-K^+$

EXAMPLE 7

An autoclave was charged with the halogen-terminated poly(n-butyl acrylate) obtained in Example 3 (259 mg), potassium methacrylate as synthesized in Production Example 3 (14.9 mg, 0.12 mmol), and N,N-dimethylacetamide (2.5 mL) and the reaction was carried out at room temperature for 61 hours. Then, 17.3 mg of potassium methacrylate was further added and the reaction was continued at the same temperature for 22 hours. This reaction mixture was diluted with ethyl acetate and washed with water. The organic layer was separated and the volatile fraction was distilled off under reduced pressure to provide an alkenyl-terminated poly(n-butyl acrylate) of the following formula. The number of alkenyl groups introduced was 1.66 per molecule of the oligomer as determined by $^1$H NMR analysis.

EXAMPLE 8

A 1L pressure glass autoclave was charged with methyl acrylate (100 mL, 1.11 mol), α,α'-dibromo-p-xylene (5.89 g, 22.2 mmol), cuprous bromide(3.18 g, 22.2mmol), 2,2'-bipyridyl (10.4 g, 66.7 mmol), acetonitrile (20 mL), and ethyl acetate (80 mL). The dissolved oxygen was removed by blowing nitrogen gas for 10 minutes. The autoclave was then closed. The mixture was then heated to 130° C. and further heated at this temperature for 30 minutes. After cooling to room temperature, the reaction mixture was diluted with ethyl acetate and the insoluble matter was filtered off. The filtrate was washed twice with diluted hydrochloric acid and once with brine. The organic layer was dehydrated over $Na_2SO_4$ and the volatile matter was distilled off under reduced pressure to provide 90.1 g of a poly(methyl acrylate) having a bromine at both termini of the following formula. As determined by GPC (polystyrene basis), the number average molecular weight (Mn) of this polymer was 5,000 and the molecular weight distribution (Mw/Mn) was 1.31. The number of bromine atoms introduced was 1.78 per molecule of the oligomer as determined by $^1$H NMR analysis.

A 50 mL three-necked, round-bottomed flask was charged with ethyl allylmalonate (0.1 mL, 0.51 mmol), potassium t-butoxide (80 mg, 0.72 mmol), and tetrahydrofuran (1.0 mL). The reaction was carried out in a nitrogen gas atmosphere at the reflux temperature for 1 hour. Then, a solution of the poly(methyl acrylate) synthesized in the above example (1.0 g) in tetrahydrofuran (2 mL) was added and the mixture was refluxed with stirring for 3 hours. This reaction mixture was diluted with ethyl acetate to about 50 mL and washed twice with 2% hydrochloric acid and once with brine. The organic layer was dehydrated over $Na_2SO_4$ and the solvent was distilled off under reduced pressure to isolate the product. This product was dissolved in a small amount of ethyl acetate and reprecipitated from hexane to provide a purified polymer. The number of alkenyl groups introduced was 0.62 per molecule of this oligomer as determined by $^1H$ NMR analysis.

EXAMPLE 9

A 50 mL three-necked, round-bottomed flask was charged with sodium hydride/oil (106 mg, 2.64 mmol). After the sodium hydride was washed with several portions of anhydrous hexane in a nitrogen atmosphere, N,N-dimethylacetamide (3.0 mL) was added. Then, a solution of allylmalononitrile (292 mg, 2.76 mmol) in N,N-dimethylacetamide (1.0 mL) was added dropwise at 0° C. and the mixture was stirred at that temperature for one hour. Then, a solution of the poly(methyl acrylate) having a halogen at a termini synthesized in Example 8 (1.0 g) in DMAc (2.0 mL) was added and stirred for an hour at a room temperature. This reaction mixture was neutralized with ice water-diluted HCl and extracted with ethyl acetate (30 mL). The organic layer was washed twice with 2% HCl and once with brine. The organic layer was dehydrated over $Na_2SO_4$ and the solvent was distilled off under reduced pressure. The residue was dissolved in a small amount of ethyl acetate and reprecipitated from hexane to provide a purified polymer (Fn(alkenyl)=1.68).

The alkenyl-terminated polymer obtained was mixed with a polyfunctional hydrosilyl compound and a platinum complex and the mixture was heated to provide a rubber-like cured product.

EXAMPLE 10

The alkenyl-terminated polymer obtained in Example 9 was reacted with dimethoxymethylsilane in the presence of a platinum complex catalyst to provide a crosslinkable silyl-terminated polymer.

The crosslinkable silyl-terminated polymer thus obtained was mixed with a tin condensation curing catalyst and water to provide a rubber-like cured product.

INDUSTRIAL APPLICAPABILITY

The present invention provides a vinyl polymer having an alkenyl or crosslinkable silyl group at its terminus at a high ratio, which are difficult to be provided, and an expedient method for preparing the same. Since the vinyl polymer of the present invention comprises those crosslinkable functional groups introduced into the terminus of the polymer chain without fail, a cured product with excellent characteristics can be provided therefrom.

What is claimed is:

1. A method for preparing a vinyl polymer having an alkenyl group of the following general formula (1) at at least one terminus of its main chain, which comprises polymerizing a vinyl monomer to obtain a vinyl polymer having a group of the following general formula (7) at at least one terminus of its main chain, and substituting an alkenyl-containing oxy anion for the terminal halogen of said polymer by reacting with a compound of the following general formula (8):

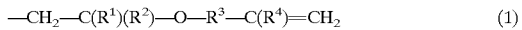

$$—CH_2—C(R^1)(R^2)—O—R^3—C(R^4)=CH_2 \quad (1)$$

wherein $R^1$ and $R^2$ are the same or different, and each represents a hydrogen atom or a univalent organic group derived from the group bound to a vinyl group of a vinyl monomer used for the production of a main chain of the polymer, $R^3$ represents —C(O)—, or an alkylene, arylene, or aralkylene of 1 to 20 carbon atoms, each optionally containing a carbonyl group that is connected to the O in formula 1, or ether or ester groups; and $R^4$ represents a hydrogen atom, an alkyl group having 1 to 10 carbon atoms, an aryl group having 6 to 10 carbon atoms, or an aralkyl group having 7 to 10 carbon atoms;

$$—CH_2—C(R^1)(R^2)(X) \quad (7)$$

wherein $R^1$ and $R^2$ represent the same as mentioned above, and X represents chlorine, bromine, or iodine;

$$M^+O^-—R^3—C(R^4)=CH_2 \quad (8)$$

wherein $R^3$ and $R^4$ represents the same as mentioned above, and $M^+$ represents an alkali metal ion or a quaternary ammonium ion.

2. The method according to claim 1 wherein $M^+$ represents sodium ion or potassium ion.

3. The method according to claim 1 wherein said vinyl monomer is polymerized using an organohalogen compound or a sulfonyl halide compound as an initiator and a transition metal complex as an catalyst.

4. The method according to claim 3 wherein the transition metal complex is a complex of one metal selected from the group consisting of copper, nickel, ruthenium and iron.

5. The method according to claim 4 wherein the transition metal complex is a complex of copper.

6. The method according to claim 1 wherein said vinyl monomer is polymerized using a chain transfer agent.

7. The method according to claim 1, wherein the vinyl monomer used for the production of the main chain of the polymer is selected from the group consisting of (meth) acrylic acid, methyl(moth)acrylate, ethyl(meth)acrylate, n-propyl(meth)acrylate, isopropyl(meth)acrylate, n-butyl (meth)acrylate, isobutyl(meth)acrylate, tert-butyl(meth) acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth) acrylate, decyl(meth)acrylate, dodecyl(meth)acrylate, phenyl(meth)acrylate, tolyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, (meth)acrylic acid-ethylene oxide adduct, trifluoromethylmethyl(meth) acrylate, 2-perfluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoroinethyl(meth)acrylate, diperfluoromethylmethyl(meth)acrylate, 2-perfluoromethyl-2-perfluoroethylmethyl(meth)arylate, 2-perfluorohexylethyl (meth)acrylate, 2-perfluorodecylethyl(meth)acrylate, 2-perfluorohexadecylethyl(meth)acrylate; styrene, vinyltoluene, α-methylstyrene, chlorostyrene, styrenesulfonic acid and salts thereof; fluorine-containing vinyl monomers; silicon-containing vinyl monomers; maleic anhydride, maleic acid, maleic acid monoalkyl esters and dialkyl esters; fumaric acid, fumaric acid monoalkyl esters and dialkyl esters; maleimide monomers; nitrile-containing vinyl monomers; amide-containing vinyl monomers; vinyl esters; alkenes; conjugated dienes; vinyl chloride, vinylidene chloride, allyl chloride, and allyl alcohol; and mixtures thereof.

8. The method according to claim 7 wherein $M^+$ represents sodium ion or potassium ion.

9. The method according to claim 7 wherein said vinyl monomer is polymerized using an organohalogen compound or a sulfonyl halide compound as an initiator and a transition metal complex as a catalyst.

10. The method according to claim 9 wherein the transition metal complex is a complex of one metal selected from the group consisting of copper, nickel, ruthenium and iron.

11. The method according to claim 10 wherein the transition metal complex is a complex of copper.

12. The method according to claim 7 wherein said vinyl monomer is polymerized using a chain transfer agent.

* * * * *